United States Patent
Romeres et al.

(10) Patent No.: US 12,397,419 B2
(45) Date of Patent: Aug. 26, 2025

(54) SYSTEM AND METHOD FOR CONTROLLING A ROBOTIC MANIPULATOR

(71) Applicant: Mitsubishi Electric Research Laboratories, Inc., Cambridge, MA (US)

(72) Inventors: Diego Romeres, Cambridge, MA (US); Xiang Zhang, Cambridge, MA (US)

(73) Assignee: Mitsubishi Electric Research Laboratories, Inc.

( * ) Notice: Subject to any disclaimer, the term of this patent is extended or adjusted under 35 U.S.C. 154(b) by 269 days.

(21) Appl. No.: 18/179,024

(22) Filed: Mar. 6, 2023

(65) Prior Publication Data

US 2024/0300097 A1  Sep. 12, 2024

(51) Int. Cl.
*B25J 9/16* (2006.01)

(52) U.S. Cl.
CPC .............. *B25J 9/163* (2013.01); *B25J 9/1664* (2013.01); *B25J 9/1697* (2013.01)

(58) Field of Classification Search
CPC ........ B25J 9/163; B25J 9/1664; B25J 9/1697; B25J 9/161; B25J 9/1661; G05B 2219/39205; G05B 2219/40053; G05B 2219/40499; G06N 3/08
USPC .................. 701/245–264; 318/568.11–568.25
See application file for complete search history.

(56) References Cited

U.S. PATENT DOCUMENTS

| | | | | |
|---|---|---|---|---|
| 5,814,959 A | * | 9/1998 | Nonaka | B25J 9/1633 318/568.22 |
| 6,004,016 A | * | 12/1999 | Spector | B25J 9/1666 700/255 |
| 6,532,400 B1 | * | 3/2003 | Jacobs | F15B 11/20 318/568.17 |
| 7,308,704 B2 | * | 12/2007 | Vogel | G06F 21/6218 726/1 |

(Continued)

FOREIGN PATENT DOCUMENTS

EP  3789921 A1 *  3/2021  ........... G06N 3/0454

OTHER PUBLICATIONS

Yin, Z. H., Sun, L., Ma, H., Tomizuka, M. and Li, W.J., May 2022. Cross domain robot imitation with invariant representation. In 2022 International Conference on Robotics and Automation (ICRA) (pp. 455-461). IEEE. (Year: 2022).*

(Continued)

*Primary Examiner* — Jaime Figueroa
(74) *Attorney, Agent, or Firm* — Gene Vinokur

(57) ABSTRACT

A controller for controlling robotic manipulator according to a task is provided. The controller is to collect data relating to a state and an object property of an object, and execute a state adapter model to produce a state correction to state of the object having the object property different from a unitary property of a unitary object. The controller is to execute a control policy using the state correction to produce an action for the unitary object, and execute an action adapter model to produce an action correction to the action produced by the control policy. The state correction and action correction are (Continued)

produced based on difference between object property and unitary property. The control policy is to map a state of the unitary object to the action of the robotic manipulator to manipulate the unitary object according to the task.

20 Claims, 15 Drawing Sheets

(56) References Cited

U.S. PATENT DOCUMENTS

| | | | | |
|---|---|---|---|---|
| 7,350,237 B2* | 3/2008 | Vogel | ............ | G06F 21/6227 |
| | | | | 726/28 |
| 7,657,345 B2* | 2/2010 | Endo | ............ | B25J 9/161 |
| | | | | 318/568.17 |
| 7,991,508 B2* | 8/2011 | Hasegawa | ............ | B62D 57/032 |
| | | | | 700/260 |
| 9,767,308 B2* | 9/2017 | Wilkinson | ............ | G06F 21/70 |
| 10,800,040 B1* | 10/2020 | Beckman | ............ | B25J 9/1605 |
| 10,926,408 B1* | 2/2021 | Vogelsong | ............ | B25J 9/163 |
| 11,232,394 B1* | 1/2022 | Pinette | ............ | H04L 67/52 |
| 11,893,327 B2* | 2/2024 | Matei | ............ | G06N 3/04 |
| 2004/0017929 A1* | 1/2004 | Bramblet | ............ | G07C 9/00 |
| | | | | 382/103 |
| 2008/0208391 A1* | 8/2008 | Hasegawa | ............ | B62D 57/032 |
| | | | | 700/254 |
| 2011/0288667 A1* | 11/2011 | Noda | ............ | G05B 19/42 |
| | | | | 700/98 |
| 2016/0350559 A1* | 12/2016 | Wilkinson | ............ | G06F 21/70 |
| 2018/0222045 A1* | 8/2018 | Khansari Zadeh | .. | G05B 19/423 |
| 2018/0236659 A1* | 8/2018 | Hogan | ............ | B25J 9/1661 |
| 2019/0143510 A1* | 5/2019 | Ohnishi | ............ | B25J 9/1633 |
| | | | | 700/257 |
| 2019/0250568 A1* | 8/2019 | Li | ............ | G06N 7/01 |
| 2019/0327271 A1* | 10/2019 | Saxena | ............ | H04L 41/0895 |
| 2020/0189099 A1* | 6/2020 | Sindhwani | ............ | G06N 3/008 |
| 2020/0276703 A1* | 9/2020 | Chebotar | ............ | B25J 9/1697 |
| 2020/0285204 A1* | 9/2020 | Iwane | ............ | G06N 20/00 |
| 2021/0101286 A1* | 4/2021 | Lee | ............ | B25J 9/1697 |
| 2021/0354926 A1* | 11/2021 | Makhal | ............ | G06N 20/00 |
| 2022/0024037 A1* | 1/2022 | Lee | ............ | B25J 13/08 |
| 2022/0040861 A1* | 2/2022 | El Khadir | ............ | B25J 9/163 |
| 2022/0134542 A1* | 5/2022 | Ohnishi | ............ | B25J 9/1633 |
| | | | | 700/250 |
| 2022/0188486 A1* | 6/2022 | Matei | ............ | G06F 30/27 |
| 2023/0173667 A1* | 6/2023 | Ijiri | ............ | B25J 17/0225 |
| | | | | 700/245 |
| 2024/0058954 A1* | 2/2024 | Bennice | ............ | B25J 9/161 |

OTHER PUBLICATIONS

Zhou et al. "Learning to Grasp the Ungraspable with Emergent Extrinsic Dexterity." 2022 https://openreview.net/forum?id=Zrp4wpa9lqh.

Shirai et al. Robust Pivoting: Exploiting Frictional Stability using Bilevel Optimization. Arxiv. 2203.11412v1 CS.RO Mar. 22, 2022.

* cited by examiner

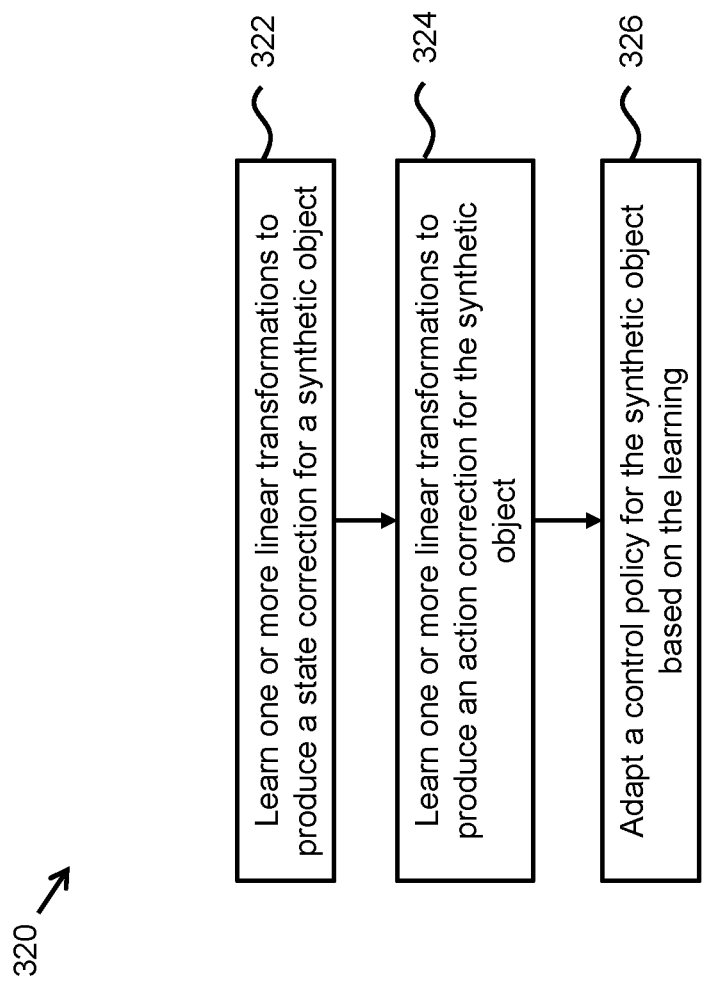

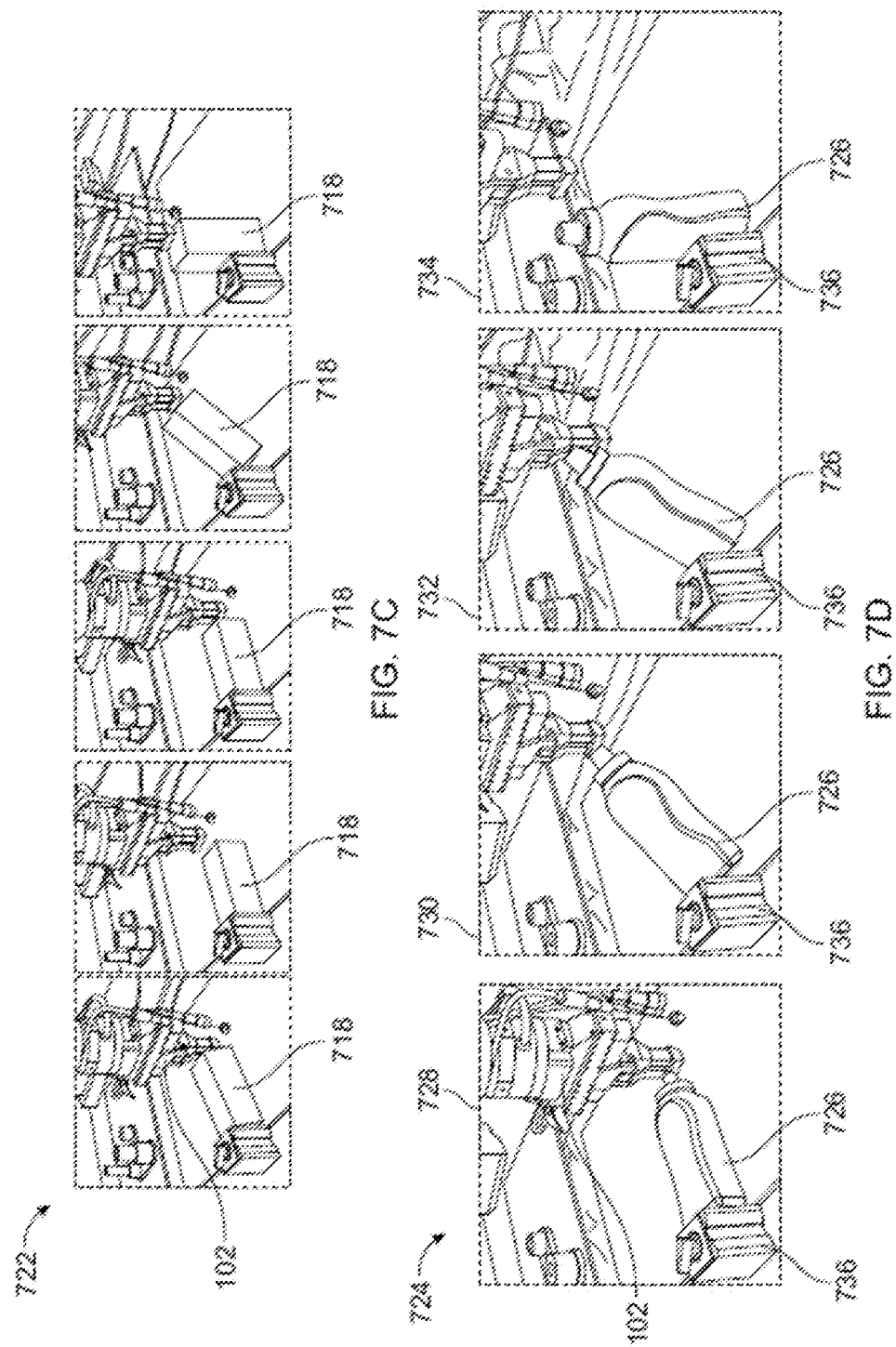

SYSTEM AND METHOD FOR CONTROLLING A ROBOTIC MANIPULATOR

TECHNOLOGICAL FIELD

The disclosure relates generally to controlling robotic manipulators, and more particularly to controlling robotic manipulators to manipulate objects according to tasks.

BACKGROUND

Robotic manipulators are electronically controlled mechanisms that perform operations by interacting with its environment. In an example, the robotic manipulators may perform table-top manipulation, such as a pivoting operation. In certain cases, the table-top manipulation may be performed to reorient or manipulate an object to create or satisfy pre-conditions required for another manipulation task.

In an example, a manipulation operation may have to be performed on a cup that may be tilted or lying down, wherein the manipulation operation may be performed to reorient the cup in a vertically upward direction for packaging of the cup. In such a case, the orientation of the cup in the vertically upward direction may be a pre-condition for another manipulation task, such as packaging, such that a robot responsible for packaging of the cup may hold the cup properly. In another example, a book on a table oriented in a wrong orientation may be too large for a robot to grasp for packaging and hence may have to be manipulated in a required direction. In yet another example, a peg may lay in the wrong orientation that may not be grasped by a robot for an insertion task and hence may have to be manipulated in a desired orientation. In such cases, manipulating the book or the peg to re-orient the book or the peg creates or satisfies pre-conditions for a successful grasp of the book or the peg, thereby ensuring smooth further operations, i.e., the grasping task for packaging or insertion.

However, a significant difficulty in performing the manipulation operation is that a robotic manipulator may have to maintain a contact between a gripper of the robotic manipulator and a surface, such as a table, on which an object to be manipulated may be placed. Moreover, different kinematic and inertial properties of different objects entail different complexity like instability, slipping, and rolling properties.

Typically, contact-based manipulation may be performed using model-based methods or model-free methods. In particular, model-based approaches develop open-loop and feedback control strategies by modeling contact dynamics. However, the contact dynamics are hybrid because of different contact modes. In certain cases, the hybrid contact dynamics may be modeled as complementarity constraints or may be formulated directly to obtain an optimal control law for controlling the robotic manipulator. In this regard, a hierarchical framework may be utilized to solve discrete contact modes and robot motions separately to reduce calculation time. However, model-based approaches require strong assumptions in initial conditions and assumptions regarding contact pairs. Model-based approaches also require precise system identification to obtain physical attributes of an object to be manipulated. Therefore, such model-based approaches may not be used for generalized manipulation of objects, such as re-orienting of different types of objects.

Continuing further, model-free approaches skip the contact dynamics modeling and directly learn a policy to perform a manipulation task, such as a re-orienting task, a packaging task, an insertion task, and so forth. In certain cases, reinforcement learning (RL) methods may be used to learn manipulation skills by optimizing a designed reward. However, a reinforcement learning (RL) policy for performing a manipulation task on an object in model-free approaches is learned on one object during training. Such RL policy may only apply to similar-sized objects and/or similar-designed objects as the object on which the RL policy was trained. This may limit application of the trained RL policy to a particular manipulation task or for a particular type of objects having similar or same physical attributes.

Generalization is a major concern for skill learning of robotic manipulators, such that robots are robust to environments and task condition changes. It may be noted that different objects that are to be manipulated may have different geometric shapes, physical attributes, and contact dynamics. Each of these differences would change a way in which the robotic manipulator interacts with the different objects, thereby making generalization of skills, specifically manipulating skills, difficult. To achieve generalization, the robotic manipulator may have to adjust manipulating skills according to different tasks and different objects. In this regard, robust manipulating skills that may work for different task settings or manipulating skills that may quickly adapt to new tasks may have to be learnt. In certain cases, domain randomization may be applied to force a learned manipulating policy to extract useful information from a state and, therefore, is robust to task changes. For example, Model Agnostic Meta Learning (MAML) may learn a set of policy parameters that may adapt to new tasks in a few trials. In certain other cases, task information may be encoded into the manipulating policy. Thus, robot actions generated by the learned manipulating policy are conditioned on the different tasks.

However, for different tasks, a state space and an action space may change according to corresponding task settings (e.g., robot type, object shape, object design, object size, object weight, goal states, etc.). Therefore, an analysis of the task settings needs to be transferred to a learned manipulating policy to perform different tasks on different types of objects. However, the mappings between the state space and the action space are either obtained from manual sources that may analyze a difference between spaces or obtained from a point cloud registration algorithm. To this end, human prior knowledge is utilized to find out the correct mapping between the state space and the action space. Moreover, such mappings may be prone to errors due to human biases or human fatigue in generating such dataset.

SUMMARY

Reinforcement learning (RL) is an area of machine learning. RL concerns taking suitable actions in an environment in order to maximize a notion of cumulative reward. RL is one of three basic machine learning paradigms, alongside supervised learning and unsupervised learning. RL may be used to identify a best possible behavior or path for completing a particular task.

Some embodiments are based on the recognition that RL does not need labeled input/output pairs and actions to be explicitly corrected for training. The RL focusses on finding a balance between exploration of uncharted territory and exploitation of current knowledge to generate output actions.

Some embodiments are based on the recognition that RL is advantageous for the robotic manipulation of different objects since labeled data for manipulation tasks are rarely available. For example, the RL may be used to learn a mapping of a state of an object to an action of a robotic manipulator to manipulate the object according to a task. Such learning may be dependent on a shape of the object, and specifics of the task. The tasks may be, for example, tilting, picking, pivoting, inserting, etc. Hence, the learned mapping by the RL for objects of a specific shape to be manipulated according to a specific task is not suitable for manipulating objects of different shapes and/or different tasks.

It is an objective of some embodiments to adapt or extend the reinforcement learning to learn a generalized policy for robotic manipulation of different objects of different shapes according to the task.

Some embodiments are based on the realization that table-top manipulation operation, may have to be performed to reorient or manipulate an object to create pre-conditions for other manipulation operation. A manipulation setup may include an object, where a robotic manipulator may exploit an interaction with the object and/or surfaces surrounding the object to manipulate the object.

Some embodiments are based on the realization that a significant difficulty in performing the manipulation operation is that the robotic manipulator has to maintain a contact between the robotic manipulator and the object as well as between the object and surfaces surrounding the object or a surface on which the object is placed.

Some embodiments are based on the realization that another difficulty in performing the manipulation operation is that different kinematic and inertial properties of different objects entail different complexities like instability, slipping, and rolling properties.

Some embodiments are based on the realization that the manipulating operations for reorienting an object with a robotic manipulator are challenging for external forces that act onto the robotic manipulator due to contact interaction. The complexity of the manipulating operation increases when same policy is required to be applied to different objects shapes, sizes, and/or designs.

Some embodiments are based on the realization that contact dynamics for performing manipulation operations are hybrid because of different contact modes during a contact. In particular, contact-rich approaches for performing manipulation operations may require strong assumptions in initial conditions or contact pairs of manipulation, and identification to obtain object property of object and/or surfaces. As a result, such contact-rich approaches may not be generalized and may not be used on different objects and/or different tasks.

Some embodiments are based on the realization that generalization of a policy for performing manipulation operations for different objects is challenging owing to different objects having different geometric shapes, different object properties and different contact dynamics. The differences in the different objects may change a manner in which the robotic manipulator may interact with the different objects according to a task, thereby making the generalization difficult. Further, for different tasks, a state and an action space may change according to task settings requiring manual analysis of difference in spaces.

Therefore, it is an object of some embodiments to provide such a method and a system that learns a RL manipulation policy for performing manipulation operations on real world objects in a structured environment with zero-shot transfer learning from simulation to real world. It is an object of some embodiments to generalize the learned manipulation policy such that the manipulation policy may be applied to arbitrary unseen objects for performing a manipulation operation according to same or different tasks. It is an object of some embodiments to provide systems and methods that automatically discovers underlying mappings on state or action space by maximizing a trajectory return for performing a manipulation operation on different objects.

It is an object of some embodiments to disclose a framework for learning a robust and generalizable manipulation policy for manipulating real-world objects from only simulation experience.

Some embodiments are based on the realization that in context of robotic manipulation, an action is dominant over a physical property, such as shape or size of an object. Hence, the physical property of an object may be used as a constraint for producing an action for manipulating the object. It is an object of some embodiments to disclose a framework for learning manipulation policy that utilizes properties, such as physical properties of an object as a constraint.

Some embodiments are based on the realization that using the physical property as a constraint allows representing the physical property of the object as a physical property associated with a predefined unitary object corrected with a correction. The correction is dependent on a difference between the physical property associated with a predefined unitary object and the physical property of the object. Hence, the correction may be applied on different objects based on the RL manipulation policy learned for the predefined unitary object.

It is an object of some embodiments to disclose a framework for learning a generalizable manipulation policy on a unitary object using RL. The manipulation policy is learned using RL to manipulate, such as re-orient or pivot one specific object, referred to as the unitary object. The manipulation policy is then applied on different objects, such as object other than the unitary object. In order to extract low-dimensional object information regarding an object from high-dimensional object depth images, supervised learning may be used. The manipulation policy learns an object feature space by predicting object size and class by applying supervised learning on a dataset collected in simulation to encode kinematic properties of arbitrary objects.

The framework then adapts the manipulation policy learned on the unitary object to multiple objects by learning data-driven projections based on object property of different objects to adjust a state and an action space of a new manipulation task. Object-specific state and action projections are learned to adapt the manipulation policy to a new arbitrary object by adjusting the state and the action space.

Some embodiments are based on the realization that as the RL may learn policy for mapping states of the unitary object to the action of the robotic manipulator, the embodiments may adapt inputs and outputs of such manipulation policy, the state and the action respectively, to extend the RL to manipulate the different objects having different object property.

Some embodiments are based on the realization that a correction based on the differences between physical property of a unitary object (referred to as unitary property, hereinafter) and physical property of an actual object (referred to as an object property, hereinafter) may be moved outside of the RL learned for the unitary object. The basic idea of some embodiments is that the manipulation policy for manipulating different objects may be computed as a transformation of a manipulation policy learned on the unitary object rather than be learned from scratch every time.

It is an object of some embodiments to train the framework for learning a generalizable pivoting policy for manipulating an object by pivoting the object against one or more contact surfaces, in simulation. The framework requires only one depth image of a unitary object and/or different objects for learning the pivoting policy and transfers the learning to real-world pivoting tasks on different objects in zero-shot. The trained pivoting policy is robust to simulation-to-real-world learning transfer and generalization to multiple objects.

Accordingly, one embodiment discloses a controller for controlling a robotic manipulator to manipulate an object according to a task. The controller comprises a memory configured to store a control policy configured to produce an action for the robotic manipulator to manipulate a unitary object having a predetermined unitary property. The control policy is configured to map a state of the unitary object to the action of the robotic manipulator to manipulate the unitary object according to the task. The memory is further configured to store a state adapter model to produce a state correction for a state of the object having an object property different from the unitary property, based on a difference between the object property and the unitary property. The memory is further configured to store an action adapter model to produce an action correction to the action produced by the control policy based on the difference between the unitary property and the object property. The controller comprises a processor configured to collect data relating to the state and the object property of the object; execute the state adapter model to produce the state correction for the state of the object to generate a corrected state of the object based on the collected data; execute the control policy using the corrected state of the object to produce the action for the unitary object; execute the action adapter model to produce the action correction to the action for the unitary object to generate a corrected action; and control the robotic manipulator with the corrected action for the unitary object The action adapter model is configured to produce the action correction to the action for the unitary object based on the corrected state of the object and property encoding of the object property relating to the object.

The processor is further configured to process, by executing an encoder, the object property of the object to produce the property encoding; transmit the property encoding to the state adapter model and the action adapter model; and produce, by executing the control policy, the state adapter model and the action adapter model, the corrected action based on the property encoding.

The object property is associated with at least one of: shape, size, density, weight, or material.

When the object property and the unitary property relates to the shape of the object and the unitary object, respectively, the processor is further configured to produce, using the state adapter model, the state correction for the state of the object having an object shape different from the unitary shape, based on a difference between the object shape and the unitary shape; and produce, using the action adapter model, the action correction to the action produced by the control policy based on the difference between the unitary shape and the object shape.

To train the control policy, the processor is further configured to generate a dataset comprising a set of random objects, the set of random objects having corresponding random shapes different from a unitary object shape of the unitary object. The processor is further configured to learn the feature space for the random objects based on a difference between each of the random object shapes and the unitary shape; and determine a predicted object shape for each of the set of random objects based on the learned feature space.

The object property is captured using one or more sensors. The corrected action comprises action parameters for controlling an interaction between the robotic manipulator and the object. The control policy comprises a neural network trained with reinforcement learning. Each of the state adapter model and the action adapter model comprises a neural network, wherein the state adapter model and the action adapter model are trained with machine learning.

To train the controller, the processor is further configured to cause the state adapter model to learn one or more linear transformations to produce a state correction to the state of the unitary object for a synthetic object; cause the action adapter model to learn one or more linear transformations to produce an action correction to an action for the unitary object based on the corrected state; and adapt the control policy for the synthetic object based on the learning.

The processor is further configured to generate a simulation environment of the task based on the unitary property, and produce the action correction based on the simulation environment.

Another embodiment discloses a method for controlling a robotic manipulator to manipulate an object according to a task using a controller having a memory configured to store a control policy, a state adapter model, and an action adapter model. The control policy is configured to produce an action for the robotic manipulator to manipulate a unitary object having a predetermined unitary property, such that the control policy is configured to map a state of the unitary object to the action of the robotic manipulator to manipulate the unitary object according to the task. The state adapter model is configured to produce a state correction for a state of the object having an object property different from the unitary property, based on a difference between the object property and the unitary property. The action adapter model is configured to produce an action correction to the action produced by the control policy based on the difference between the object property and the unitary property. The method comprises collecting data relating to the state and the object property of the object; producing, using the state adapter model, the state correction for the state of the object to generate a corrected state of the object based on a difference between the object property and a predetermined unitary property of a unitary object; producing, using the control policy, the action for the unitary object using the corrected state of the object; producing, using the action adapter model, the action correction to the action for the unitary object to generate a corrected action; and controlling the robotic manipulator with the corrected action for the unitary object.

Yet another embodiment discloses a non-transitory computer readable storage medium embodied thereon a program executable by a processor for performing a method for controlling a robotic manipulator to manipulate an object according to a task using a controller having a memory configured to store a control policy, a state adapter model, and an action adapter model. The control policy is configured to produce an action for the robotic manipulator to manipulate a unitary object having a predetermined unitary property, such that the control policy is configured to map a state of the unitary object to the action of the robotic manipulator to manipulate the unitary object according to the task. The state adapter model is configured to produce a state correction for a state of the object having an object property different from the unitary property, based on a difference between the object property and the unitary property. The action adapter model is configured to produce an action correction to the action produced by the control policy based on the difference between the object property and the unitary property. The method comprises collecting data relating to the state and the object property of the object; producing, using the state adapter model, the state correction for the state of the object to generate a corrected state based on the collected data; producing, using the control policy, the action for the unitary object using the corrected state of the object; producing, using the action adapter model, the action correction to the action for the unitary object to generate a corrected action; and controlling the robotic manipulator with the corrected action for the unitary object.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3C illustrates an example method for learning a state adapter model and an action adapter model to generalize a control policy, according to an embodiment of the present disclosure.

FIG. 7A, FIG. 7B, FIG. 7C and FIG. 7D illustrate examples of a controlled trajectory for manipulating objects during a manipulation operation, according to various embodiments of the present disclosure.

DETAILED DESCRIPTION

Figure 1A:
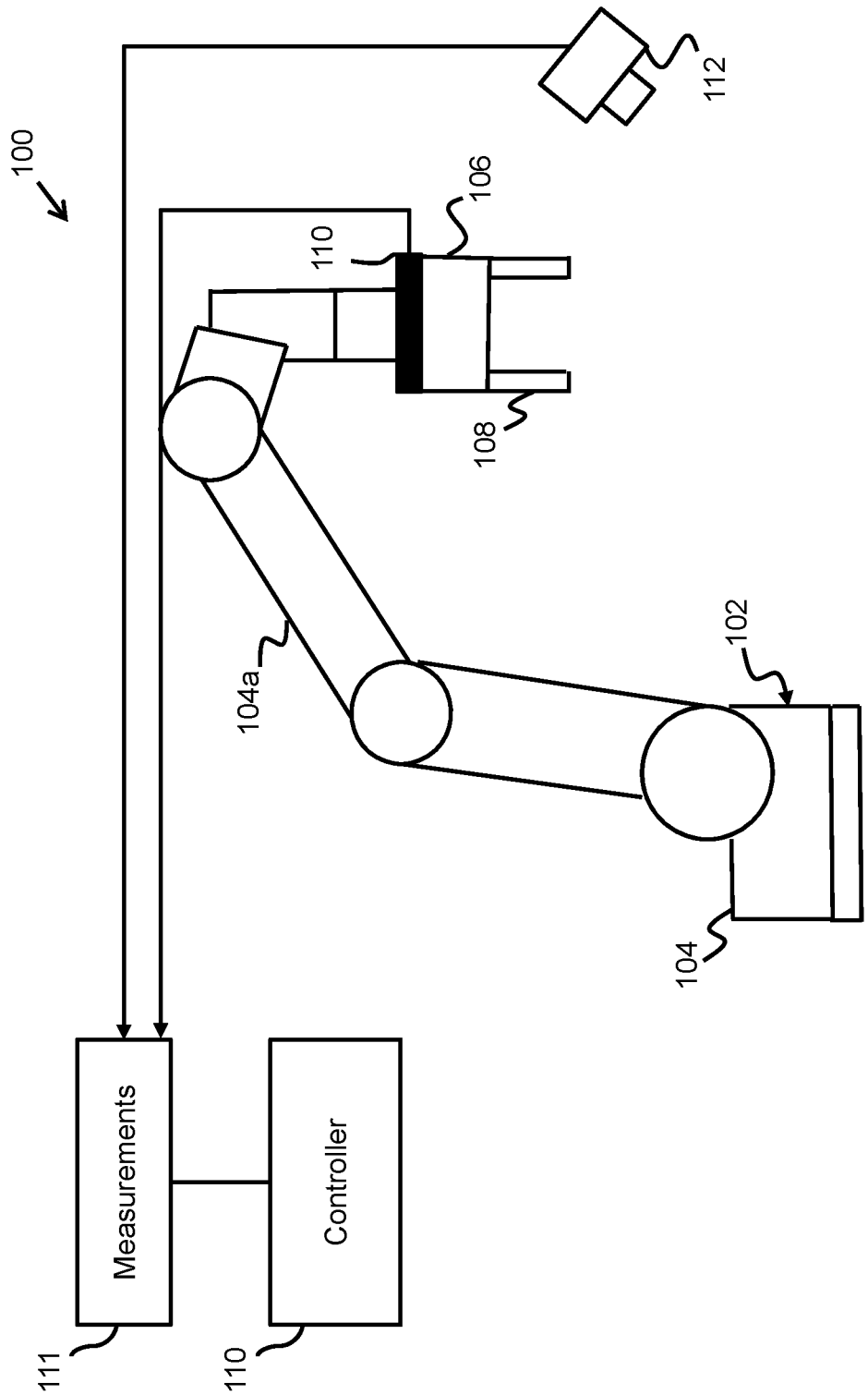
FIG. 1A illustrates a robotic manipulator for manipulating an object, according to some embodiments of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

It is an object of some embodiments to disclose a controller for controlling a robotic manipulator to manipulate an object according to a task. It is an object of some embodiments to disclose a control policy trained with RL to produce actions for the robotic manipulator to manipulate a unitary object of a predetermined unitary shape. It is an object of some embodiments to disclose techniques for generalizing the control policy and manipulating unseen objects without any training in the real world environment. It is an object of some embodiments to disclose techniques for domain randomization that leads to robustness on measurement error on the state, e.g., position of an object, force measurements, initial pose distribution of environment, etc., and failure recovery. It is an object of some embodiments to disclose the control policy that recovers from a complete failure like losing contact with the object during manipulation. According to some embodiments, the generalization of the control policy allows to do the training of the control policy only in simulation and generalize to novel objects with different shapes in the real world, thereby reducing the training time in the real world to null. It is an object of some embodiments to disclose techniques for a variety of table top manipulation operations, for example, reorienting an object to a different orientation, pushing an object to a different location, grasping an object in a different location or with a different approach, sliding, tipping, rolling, throwing, pivoting or any other type of manipulation of a state of the object.

FIG. 1A illustrates an environment 100 where a robotic manipulator 102 is implemented, according to some embodiments. The robotic manipulator is configured to manipulate an object. The robotic manipulator 102 includes a locomotion device 104 for providing locomotion in the robotic manipulator 102. In an example, the locomotion device 104 may include one or more motors to provide locomotion. For example, the one or more motors may include, but is not limited to, an electric motor, a hydraulic motor, and a pneumatic motor. The locomotion device 104 may provide power for movement or locomotion of a robotic arm 104a of the robotic manipulator 102. For example, the robotic arm 104a may have one or more degrees of freedom for moving an object or the robotic manipulator 102. In an example, the robotic arm 104a is provided with an end-tool 106 for ensuring multiple degrees of freedom of moving an object. In some implementations, the end-tool 106 has a gripper 108 for manipulating or holding the object.

Figure 1B:
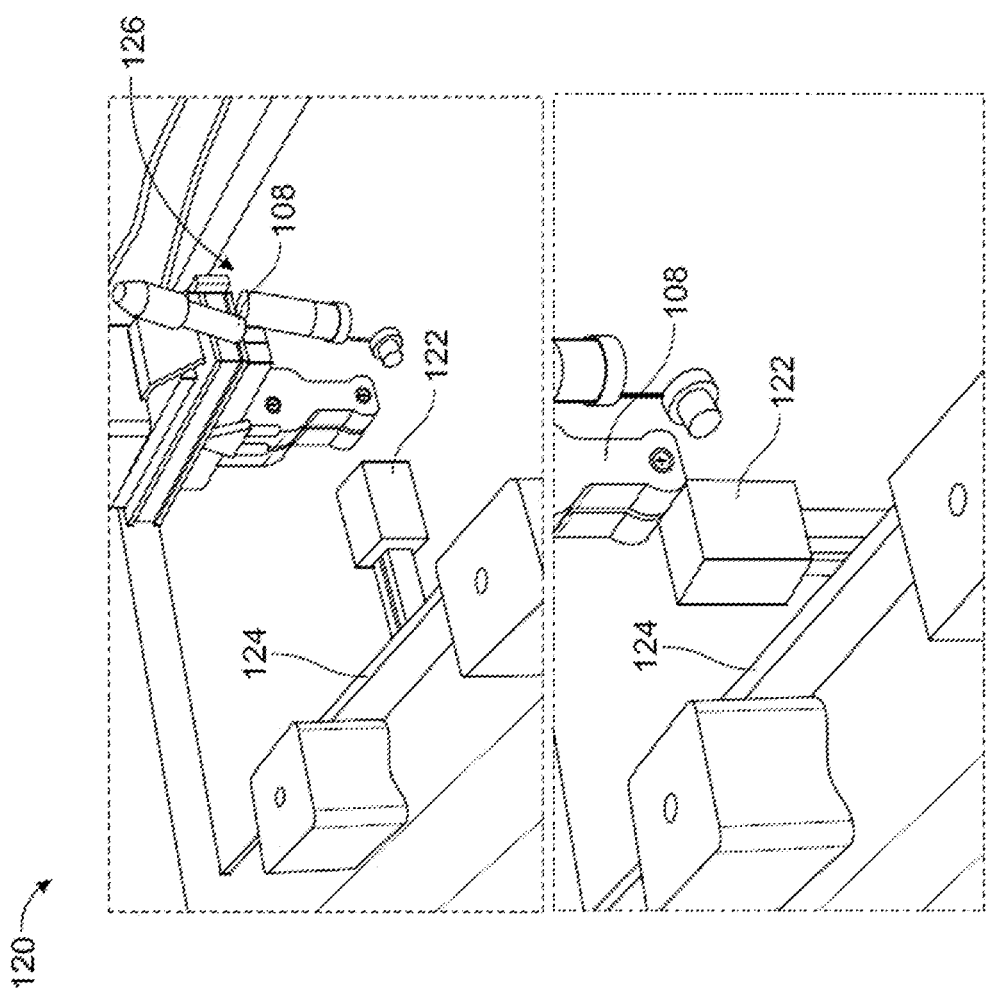
FIG. 1B illustrates an exemplary manipulating operation, according to an embodiment of the present disclosure.

Referring to FIG. 1B, an exemplary manipulating operation 120 is shown, according to an embodiment. For example, an objective of the manipulation operation 120 is to change a state of an object 122, for example, reorienting the object 122 by changing its pose.

A robotic manipulation task is performed by the robotic arm 104a. The robotic arms 104a may be configured to perform a manipulation operation to, for example, re-orient the object 122 using an environment. Other examples of the robotic manipulation task may include, but is not limited to, insertion of an object in a connector also known as peg in a hole type of operation, pick and place operation, assembly of a product, and so forth.

As shown in FIG. 1B, the object 122 is at rest on a flat surface such as a table-top 126, and the object 122 is in the proximity of a second surface, namely a contact surface 124, perpendicular to the table-top 126. The object 122 may be manipulated by the end-tool 106 of the robotic arm 104a that may establish a patch contact with the object 122, for example, between the fingers of the gripper 108 and the object 122. The gripper 108 may re-orient or manipulate the object 122 by pushing it against the contact surface 124 on the table-top 126 in the fixed environment and using a control policy according to embodiments of the present disclosure.

In an example, the control policy may be represented as, $\pi(\cdot|s)$ where s is a system state. The control policy may generate control command for controlling operation of the gripper. In this regard, to perform the manipulation operation, the control policy may cause to bring the gripper 108 in contact with the object 122, and then cause to establish contacts between the object 122 and the contact surface 124. The control policy may utilize the environmental contacts, such as the contacts between the gripper 108 and the object 122, the object 122 and the table-top 126 and the object 122 and the contact surface 124 to manipulate or re-orient the object 122 to a stand up or vertical position. In an example, the control policy may cause the gripper 108 to pivot the object 122 while maintaining contacts between the object and the contact surface 124, the object 122 and the table-top 126 and the gripper 108 and the object 122. In an example, the control policy comprises a neural network trained using reinforcement learning technique. In particular, the control policy is trained to generalize to different types of objects using a state adapter model and an action adapter model, such that the control policy may transfer simulation learning learned on a unitary object of a pre-defined unitary property to unseen real-world objects in zero-shot. The term "control policy" is used interchangeably with "reinforcement learning (RL) policy" and "manipulation policy".

In particular, the unitary object refers to any object, such as a random object, having pre-defined property. In an example, the unitary object may have a predefined shape, a predefined size or dimension, a predefined material property, a predefined weight, and a predefined density. In other words, physical parameters of the unitary object may be known and pre-defined. In an example, the unitary object may be a cube wherein each side of the cube may be 10 cm long. Further, the cube may be made of hard plastic, such as ABS, having weight of 10 grams and density of 0.5 g/cm$^3$. Such example of the unitary object is only illustrative and should not be construed as a limitation.

To this end, the representation of the robotic manipulator 102 and the manipulation task of reorienting or pivoting the object 122 using the contact surface 124 and the table-top 126 should not be construed as a limitation. In other embodiments of the present disclosure, the robotic manipulator 102 may include other components, such as a body, one or more sensors, end effectors, feedback devices, manipulators, and so forth. In other embodiments of the present disclosure, the manipulation task may be a different task, such as an insertion task, a grasping task, and so forth.

Referring back to FIG. 1A, the robotic manipulator 102 includes a force sensor 110 operatively connected to the end-tool 106 and/or the gripper 108 of the robotic arm 104a. The robotic manipulator 102 also includes a visual sensor 112. For example, the visual sensor 112 may be a camera, an RGB camera, an RGBD camera, a camcorder, a depth camera, a range camera, a thermal camera, a computer, a scanner, a mobile device, a webcam and so forth. For example, measurements or signals from the force sensor 110 and/or the visual sensor 112 may be processed and used for classification, recognition or measuring a state and/or object property of the object 122.

The force sensor 110 may be configured to measure a force tensor experienced by the end-tool 106 and/or the gripper 108 of the robotic manipulator 102 during a manipulation operation. In an example, the force sensor 110 may be mounted on the gripper 108 of the robotic arm 104a. For example, the force tensor measured by the force sensor 110 includes measurements of force and measurements of moment along an axis of the robotic manipulator 102. For example, measurements of force and measurements of moment along the axis of the robotic manipulator 102 may be referred to as Fx, Fy, Fz, Mx, My, Mz.

The force sensor 110 measures force and torque of the object 122 against the contact surface 124 and the table-top 126 during the object manipulation, as described in FIG. 1B. In addition, the force sensor 110 may contain one or more encoders to measure position and orientation of the object 122 along three axis of the end-tool 106 of the robot and of the robot's joints. In certain cases, the robotic manipulator 102 may also include acceleration sensors, angle sensors, and tactile sensors.

The visual sensor 112 is arranged at a position such that the visual sensor 112 may observe a state of the object 122 to be manipulated. In some embodiments the object state is a 6D pose including a Cartesian pose and an orientation of the object 122. In some embodiments the visual sensor 112 is configured to estimate a pose of the object 122 on the table-top 126 with respect to the contact surface 124 in the environment. To this end, the visual sensor 112 detects and estimates the pose of the object 122 to be manipulated. The measurements from the force sensor 110 and data from the visual sensor 112 may be stored as measurements 111. The measurements 111 may be used for manipulating the object 122, using a controller 114.

In an example, the force sensor 110 is arranged at joints of the robotic manipulator 102, such as the robotic arm(s) 104a, the end-tool 106, and/or the gripper 108 to measure the forces external to the robotic manipulator 102. The visual sensor 112 may be arranged in any position that provides a view point to observe or determine state of the object 122 representing a positional relationship among the object 122, the table-top 126, and the contact surface 124.

Figure 1C:
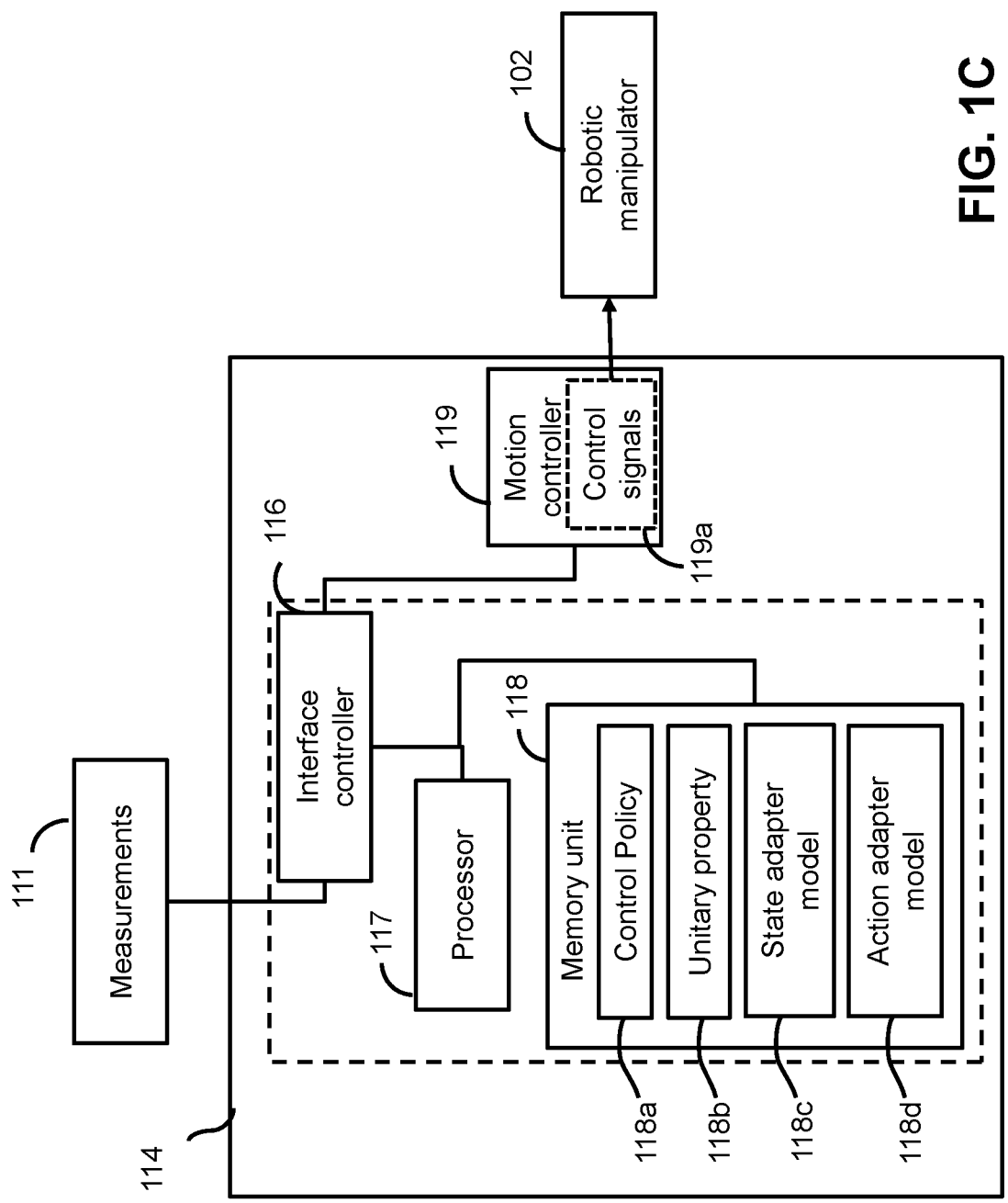
FIG. 1C illustrates a block diagram of a controller for controlling a robotic manipulator, according to an embodiment of the present disclosure.

Referring to FIG. 1C, an example block diagram of the controller 114 for controlling the robotic manipulator 102 is illustrated, according to some embodiments. The controller 114 is coupled to the robotic manipulator 102 controller 114 for controlling motions of the robotic manipulator 102 according to embodiments of the present disclosure. In an example, the controller 114 is configured to determine whether the object 122 needs to be manipulated before the object 122 can be used for another desired task. For example, the controller 114 is configured to determine if a pose of the object 122 needs to be manipulated as a pre-condition of performing another task. Examples of another task may include, but is not limited to, assembly, packaging, insertion, and so forth. The controller 114 is configured to compute and transmit a command or a control action to apply to the robotic manipulator 104a for manipulating the object 122. For example, the controller 114 may be configured to compute the command or the control action using a control policy, a state adapter model and an action adapter model proposed in the embodiments of the present disclosure. The robotic manipulator 102 applies the command to manipulate the object 122.

The controller 114 may include an interface controller 116, a processor 117, and a memory unit 118. The memory unit 118 is configured to store a control policy 118a, unitary property 118b of a unitary object, a state adapter model 118c, and an action adapter model 118d. In an example, the processor 117 may include one or more processing units. The memory unit 118 may include, but is not limited to, memory devices, a data storage device, and the like.

Further, the interface controller 116 may be an interface circuit including, for example, analog/digital (A/D) converters and digital/analog (D/A) converters. The interface controller 116 may generate signal or data for communication with the force sensor 110 and/or visual sensor 112 to obtain the measurements 111, as well as a motion controller 119 for controlling the robotic manipulator 102. The interface controller 116 may include a memory to store data to be used by the A/D or D/A converters. In addition, the motion controller 119 includes a policy unit 119a to generate action parameters based on an action produced by the control policy, to control the robotic manipulator 102 that controls the robotic arm 104a. In an example, an interaction between the object 122 and the robotic arm 104a may be controlled and regulated by the trained control policy 118a, using the state adapter model 118c and the action adapter model 118d.

The controller 114 may be connected to the force sensor 110 and the visual sensor 112 to obtain the measurements 111. In certain cases, the motion controller 119 may control individual electric motors that drive angles of the robotic arm 104a or handling of the object 122 by the gripper 108. In an example, the motion controller 119 may control the rotations of individual motors arranged in the robotic arm 104a to smoothly accelerate or safely decelerate the motion of the robotic manipulator 102 in response to control signals. In another example, the motion controller 119 may control actuators in the robotic arm 104a in response to the control signals generated by the control policy 118a. For example, the control signals may be generated by the control policy 118a, based on the unitary property 118b, the state adapter model 118c, the action adapter model 118dc and the measurements 111.

To this end, the controller 114 may adapt the control policy 118a trained using reinforcement learning techniques for robotic manipulation robust to different objects of different shapes according to a task. For example, the controller 114 and the control policy 118a may be a neural network-based reinforcement learning policy. The control policy may be used to re-orient the object 122 or parts of the object 122 during a robotic assembly process, packaging process, and so forth. The state adapter model 118c and the action adapter model 118d enables the control policy 118a to adapt or to generalize, in order to manipulate different objects of different physical properties according to a task. A manner in which the control policy 118a is trained and performs manipulation operations for manipulating different objects is explained in conjunction with the following figures.

It is an objective of some embodiments of the present disclosure to adapt or extend reinforcement learning to robotic manipulation for manipulation of different unseen objects having different physical properties based on the control policy 118a trained on a unitary object having predefined unitary property 118b. Some embodiments are based on the realization that at least in the context of robotic manipulation, an action is dominant over physical property of objects. Hence, the physical property of the objects may be seen as a constraint for producing the action for manipulating the objects.

To that end, the control policy 118a having an RL-based neural network may be used to produce actions for the robotic manipulator 102 to manipulate a unitary object having the predetermined unitary property 118b. In such a case, the control policy 118a maps a state of the unitary object to an action of the robotic manipulator to manipulate the unitary object according to the task. In this manner, the control policy 118a is trained to map states of an unseen or new object with action of the robotic manipulator 102 for manipulating the new object. This is described in detail in conjunction with FIG. 2. Further, the control policy 118a needs to be trained to adapt according to objects. A manner in which the control policy 118a is trained to adapt for a new object and generate manipulation control actions for the new object is described in detail in conjunction with FIG. 3A, FIG. 3B, FIG. 3C and FIG. 5.

Figure 2:
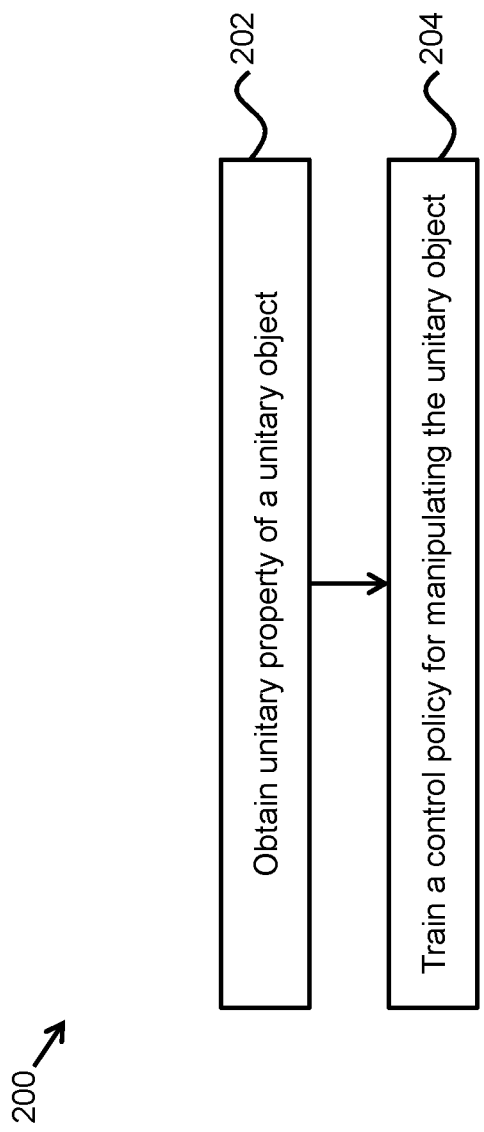
FIG. 2 illustrates an example method for training a control policy for manipulating a unitary object, according to an embodiment of the present disclosure.

FIG. 2 illustrates an example method 200 for training the control policy 118a for manipulating a unitary object, according to some embodiments. In an example, the control policy 118a may be trained with reinforcement learning to produce actions for the robotic manipulator 102. Based on the produced actions, the robotic manipulator 102 may manipulate the unitary object according to a task.

As discussed earlier, RL is advantageous for robotic manipulation of different objects as the labeled data for such tasks are rarely available. RL focuses on how an agent ought to take actions in an environment in order to maximize a notion of cumulative reward. For example, the RL can be used to learn a mapping of a state of an object to an action of a robotic manipulator to manipulate the object according to the task. Such learning is dependent on two things an object property of an unseen object, and specifics of the task itself, such as tilting, pivoting, picking, inserting, etc. The method 200 is based on the use of RL to train the control policy 118a for manipulating a unitary object.

At 202, the unitary property 118b of a unitary object is obtained. For example, the unitary object may have a predefined physical structure. To this end, the unitary property 118b may correspond to the predefined physical structure of the unitary object. Further, the unitary property 118b may indicate at least one of, for example, shape, size, dimensions, density, material, and weight of the unitary object.

In an example, the unitary property 118b may be determined based on usage of one or more sensors. For example, when a sensor is a camera, a depth image of the unitary object may be captured. For example, such depth image may be captured by the visual sensor 112, wherein the visual sensor 112 is a depth camera. Based on the depth image of the unitary object, the unitary property 118b corresponding to physical structure of the unitary object may be determined. In certain cases, the depth image of the unitary object may also be used to identify a state of the unitary object. For example, the state of the unitary object may indicate, but is not limited to, a pose of the unitary object, a location of the unitary object, an orientation of the unitary object, and so forth. In another example, the unitary property 118b and the state of the unitary object may be provided as an input for training the control policy 118a.

At 204, the control policy 118a for manipulating the unitary object is trained. In particular, a neural network in the control policy 118a is trained using reinforcement learning. In this regard, the RL control policy 118a may identify and perform an action for manipulating the unitary object. For example, the trained control policy 118a may include the state of the unitary object mapped to an action of the robotic manipulator to manipulate the unitary object according to a task. In an example, the task may have to be performed on the unitary object. Examples of the task may include, but is not limited to, assembly, manufacturing, packaging, quality check, and so forth. For example, the task may have a set of predefined steps, and each of the steps may have corresponding predefined inputs and predefined outputs. To this end, the predefined inputs and the predefined outputs of the steps of the task may indicate a desired state of the unitary object. For example, an input of a step may indicate a desired state of the unitary object for performing the step, and an output may indicate a desired state of the unitary object after an operation associated with the task is performed. Based on the desired state of the unitary object for performing a step and a current state of the unitary object, a manipulation operation may have to be performed. For example, the manipulation operation may be performed to manipulate the unitary object such that a current state of the unitary object is changed to the desired state for performing a step of the task. In this regard, the current state of the unitary object may be mapped to an action to be performed on the unitary object, based on the desired state of the unitary object. In an example, the state-action mapping may be done in an embedded latent space.

For example, the control policy 118a is trained with RL to produce action parameters for the robotic manipulator 102 to cause the robotic arm 104a or the gripper 108 to manipulate the unitary object according to the required action. For example, the control policy 118a may learn to assess the unitary property 118b, identify the required action, and generate the action parameters based on the unitary property 118b and the required action to manipulate the unitary object from the current state to the desired state.

In an example, the task associated with the unitary object is packaging task. For example, in case of the packaging task, the predefined steps may include, but is not limited to, picking the unitary object, placing the unitary object on a conveying belt, checking parameters of the unitary object as per quality check, picking the unitary object, and placing the unitary object within a packaging box. Further, the unitary object may have to be positioned in a particular manner on the conveying belt, such that a robotic arm is able to grasp or pick the unitary object in a reliable manner without damaging the unitary object. For example, if the unitary object is a cup, then the cup may have to be placed in a vertically upwards direction such that the robotic arm can lift the cup through its handle without breaking or damaging it. In such a case, if a current state of the cup is horizontally inclined, such as laying down on the conveying belt, then a manipulation operation may be performed to lift the cup in vertically upwards state to reach a desired state of the cup. To this end, the manipulation operation may be performed by applying a pivoting action on the cup to re-orient the cup in the vertically upwards state.

In this manner, the control policy 118a may learn to produce the action for the manipulation operation of the unitary object according to the task. For example, the produced action may be further used to produce new actions for manipulating different objects in real-world scenarios. A manner in which the control policy 118a is trained to adapt or transform for generating new actions for different objects is described in detail in conjunction with FIG. 3A, FIG. 3B, and FIG. 3C.

To this end, all the advantages of the RL algorithms are included in the control policy 118a. The advantages include domain randomization that leads to robustness on measurement error for a state of an object such as, position of the object, force measurements, initial pose distribution of the environment, and so forth. The advantages also include failure recovery. Subsequently, the control policy 118a may be able to recover from a complete failure such as, losing contact with the object during collaboration or interaction for manipulating the object.

Figure 3A:
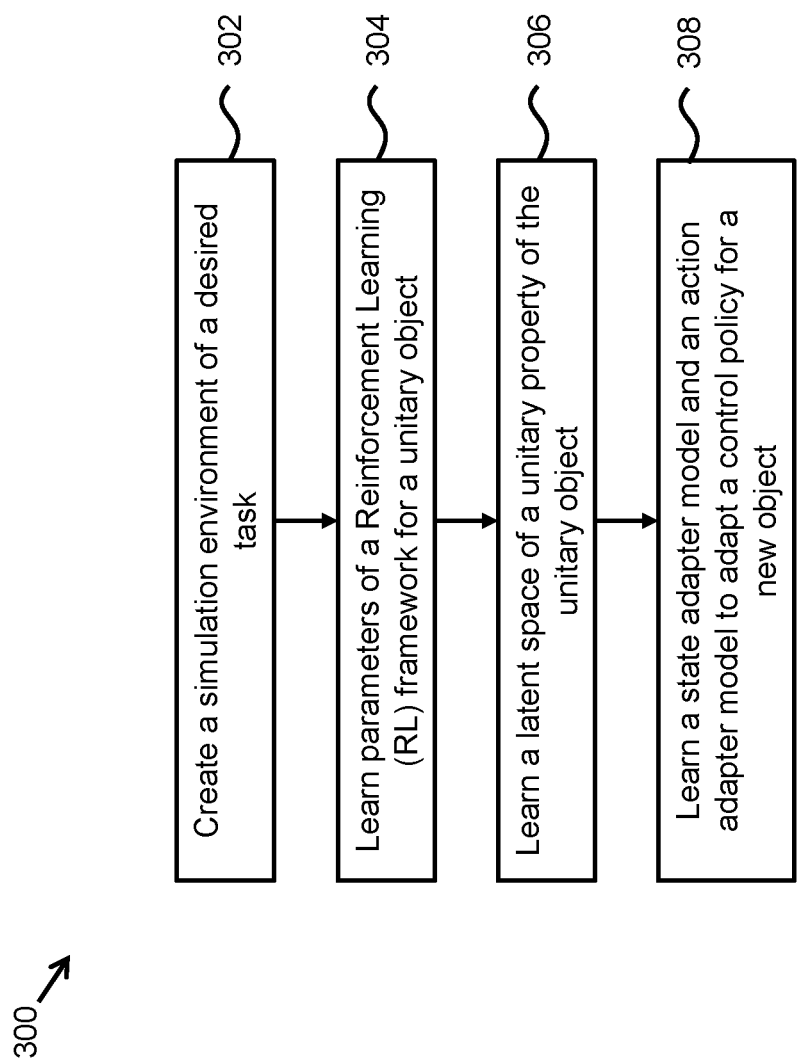
FIG. 3A illustrates an example method for training a control policy to adapt for a new object, according to an embodiment of the present disclosure.

FIG. 3A illustrates an example method 300 for training the control policy 118a to adapt for a new object, according to some embodiments of the present disclosure. For example, the controller 114 may cause the robotic manipulator 102 and/or the robotic arm 104a to perform a desired manipulation task based on control inputs from the control policy 118a. As described above, the control policy 118a may be trained to generate action for the unitary object, according to a task.

It may be noted that a manipulation task on different objects may be computed as a transformation of the control policy 118a learned on the unitary object, rather than be learned from scratch every time. The steps of the method 300 describe training of the control policy 118a to adapt or transform for different objects according to a task.

In this regard, at 302, a simulation environment of a desired task is created. The simulation environment is created based on the unitary object and the corresponding unitary property 118b. Further, the simulation environment is created to train the control policy 118a to adapt for new objects. For example, the task may be a packaging or an assembly task.

At 304, parameters of a reinforcement learning framework are learned in the simulation. In particular, the parameters of the RL framework are learned to train the control policy 118a to manipulate a unitary object. The RL framework to train the control policy may be mathematically defined as a Markov Decision Process, MDP={S, A, R, T, γ} which is a tuple where S is a set of states, A is a set of actions, R is a reward function that assigns a real value to each state-action pair, T is a state-transition function, and γ is a discount factor. In an example, the parameters of the RL framework may be associated with weights of the control policy 118a.

For example, the control policy 118a, denoted as: $\pi_\theta^u$ (a|s), may be parameterized by θ for training in the created simulation environment. In the simulation environment, the robot gripper 108 and the unitary object may be included. For example, the unitary object is a 9×9×3 [cm]³ box. It may be noted that the unitary property 118b, i.e., size, shape, weight, texture, etc., of the unitary object is arbitrarily chosen, and it doesn't limit embodiments of the present disclosure. Moreover, a rigid wall or contact surface 124 is placed at O or origin to act as an external surface in an environment where the unitary object may be manipulated.

The parameters of the RL framework to train the control policy 118a are based mathematically on a state space, an action space, a reward function, and a transition function. It may be noted that the embodiments of the present disclosure describe use of the control policy 118a to control the robotic manipulator 102 and/or the gripper 108 for manipulating the unitary object and learn how to manipulate the robotic manipulator 102 in case of different objects, in a reliable manner.

In an example, the control policy 118a interacts with its environment in discrete time steps. At each time step t, the control policy 118a receives an observation $o_t$ and a reward $r_t$. The control policy 118a then chooses an action $a_t$ from a set of available actions for manipulating the unitary object to increase the reward, and the chosen action is subsequently sent to the environment. In this manner, the control policy 118a is trained to learn how to manipulate the unitary object or identify a required action for manipulating the unitary object according to different tasks based on the reward at different time steps, the environment, the unitary object, task settings, and the unitary property.

In an example, a state space, s, may be defined by different components such as, an object pose $s_o$, a gripper pose $s_g$, and external forces $s_F$ measured by the force sensor 110 at the end-tool 106 of the robotic manipulator 102. For example, the object pose and the gripper pose include Cartesian position of the unitary object along X, Y, and Z axes and orientation quaternion. Further, a force $s_F$ measured by the force sensor 110 includes forces measured along the X, Y, and Z axes. To that end, $s_o, s_g \in R^7$, and $s_F \in R^3$. Thus, the state space may be denoted as: $s := [s_o, s_g, s_{\{F\}}] \in R^{\{17\}}$. For example, a maximum force applied by the robotic manipulator 102 in the simulation may be threshold at ±10 Newton (N) in each axes, and $s_F$ is normalized to ±1N.

Continuing further, an action space, a, is defined by a linear velocity of the robotic arm 104a, the end-tool 106 and/or the gripper 108 in each of X, Y, and Z axes as well as an angular velocity in a pitch direction. To this end, $a = [a_x, a_y, a_z, a_\rho] \in R^4$. For example, actions in the action space are limited by a moving threshold set to, for example, 25 mm, 50 mm, 1 cm, 2 m, and so forth. Therefore, if the gripper 108 moves more than the threshold during training, the robotic manipulator 102 may stop and the controller 114 or the control policy 118a proceeds to select a different action for manipulating the unitary object.

Moreover, the reward function is a distance between a current unitary object rotation matrix, R, and a goal rotation matrix, $R^{\{goal\}}$. The reward function is defined as:

$$r = \frac{\pi}{2} - d,$$

with $d = \cos^{-1}(0.5(Tr(R^{\{goal\}}R^*)-1))$

In this regard, Tr(•) indicates that a trace of a matrix.

$$\frac{\pi}{2}$$

is added to the reward to make an initial reward close to 0. The reward encourages the control policy 118a to manipulate the unitary object to the goal or desired orientation $R^{\{goal\}}$. In an example, the unitary object may be laying down on a table-top and the goal orientation or goal pose may be set as an orientation when the unitary object is perpendicular or vertically upwards with respect to the table-top. For example, task settings associated with a task to be performed on the unitary object may indicate a type of task, steps of the task, input and output of the steps of the task, and he like. Subsequently, based on the parameters of the RL framework, the unitary property 118b and the task settings associated with the task, the control policy 118a may produce or identify an action for manipulating the unitary object to the desired or goal state according to the task.

In an example, domain randomization is employed to improve the robustness of the control policy 118a against different kinds of noises such as, uncertainty in position of the wall or the external contact surface 124 in the environment, force measurement noise, and initial pose distribution noise for the unitary object. In this case, an origin of a frame is set at the wall or the external contact surface 124, and an exact position of the wall is assumed to be unknown. Therefore, as the position of the unitary object and the gripper 108 are measured w.r.t the wall or the external contact surface 124, the uncertainty in the position of the wall or the contact surface 124 may be modeled by adding a zero-mean Gaussian noise with a standard deviation of 2 centimeters (cm) to the parameters of the RL framework. Further, to model the noise of the force sensor 110 measurements, a zero-mean Gaussian noise with a standard deviation of 0.5 Newton [N] may be added to a measured force in the simulation environment. In addition, during the training, the initial pose of the unitary object may be randomized. Specifically, the unitary object is placed with an offset to the wall or the external contact surface 124 and is oriented by a random angle. An initial offset $\Delta_x$ is sampled uniformly between a range [0, 5] cm. To avoid the unfeasible initial pose, an initial rotation angle limit is defined as $$\pm \tan^{-1}\left(\frac{\Delta_x}{4.5}\right)$$

and the initial rotation angle is sampled from the predefined range.

At 306, a latent space of the unitary property 118b is learned to represent the unitary property 118b of the unitary object. For example, the unitary object is represented in the simulation environment based on the embedding of the unitary property 118b in the latent space. In an example, representation learning may be utilized for encoding the unitary property 118b of the unitary object in the latent space. Some embodiments of the present disclosure rely on representation learning to learn a low-dimensional feature space of the unitary property 118b based on depth images of the unitary object. For example, RGB textures of the depth images may be used to identify the physical property or the unitary property 118b of the unitary object and further represent the unitary property 118b in the latent space. For example, the encoding of the unitary property 118b may be generated using supervised learning.

In certain cases, a dataset of depth images of the unitary object may be created in the simulation environment to learn the feature space or create the encoding of the unitary property 118b. For example, the dataset is generated from different object classes $c_{\{obj\}}$ relating to the unitary object. A manner in which the dataset is generated and utilized to adapt and generalize the control policy 118a for new objects is described in detail in conjunction with FIG. 3B. Thereafter, the control policy 118a adapts the encoding of the unitary property 118b to work with, i.e., perform a manipulation operation on, multiple different objects according to corresponding tasks. Typically, kinematic information of new real-world objects during application may be utilized to adapt the encoding of the unitary property 118b.

At 308, the state adapter model 118c and the action adapter model 118d are learned to adapt the control policy 118a for a new object by adjusting a state space and an action space. In particular, the state adapter model 118c and the action adapter model 118d learn linear transformations to adjust both the state space and the action space of the unitary object and generalize the control policy 118a to new objects. Such linear transformations for the state space and the action space are referred to as state and action projection nets.

The state adapter model 118c and the action adapter model 118d allow generalizing the control policy 118a to multiple different objects for robotic manipulation tasks. The state adapter model 118c and the action adapter model 118d also allow generalizing the control policy 118a to represent physical property of different objects (referred to as object parameters, hereinafter) in a latent feature space. In an example, each of the state adapter model 118c and the action adapter model 118d are trained using machine learning, specifically supervised machine learning to adapt the RL control policy 118a. In this manner, the state adapter model 118c and the action adapter model 118d enable the RL control policy 118a to produce a new action for a new object based on the simulation environment.

In an example, an encoder may be utilized for processing an object parameter of a random new object. The encoder may produce a feature encoding of the object parameter in the latent space for the new object. Further, the encoder may transmit the encoded object parameter to the state adapter model 118c and the action adapter model 118d. The state adapter model 118c and the action adapter model 118d may utilize the encoded object parameter to adapt or transform the control policy 118a for the new object. The transformed or adapted control policy 118a may thus generate a state-action mapping for the new object according to an associated task. In this manner, the transformed control policy 118a may determine an action for the new object to modify a current state of the new object to a desired state according to the task.

In an example, overall generalizable RL framework consists of: the control policy 118a; an object feature extraction network, i.e., encoder for encoding the unitary property 118b in the latent space; the state adapter model 118c; and the action adapter model 118d. To this end, once the parameters of the RL framework are defined and the encoding of the unitary property 118b is generated, the control policy 118a and the object feature extraction network are trained and their corresponding weights are frozen. During training, the object feature extraction network learns to extract physical parameter of a new object based on corresponding depth images or other sensor values, and encode the physical parameter of the new object in the latent space. Moreover, the control policy 118a learns to generate a state-action mapping to determine an action to be performed on a new object to manipulate the object based on the encoded object parameter, the parameters of the RL framework, encoding of the unitary property 118b, and state-action mapping for manipulating the unitary object.

Thereafter, only the state adapter model 118c and the action adapter model 118d need to be trained to adapt the control policy 118a to different objects. A manner in which the state adapter model 118c and the action adapter model 118d generalize the control policy 118a for different objects is described in detail in conjunction with FIG. 3C.

Figure 3B:
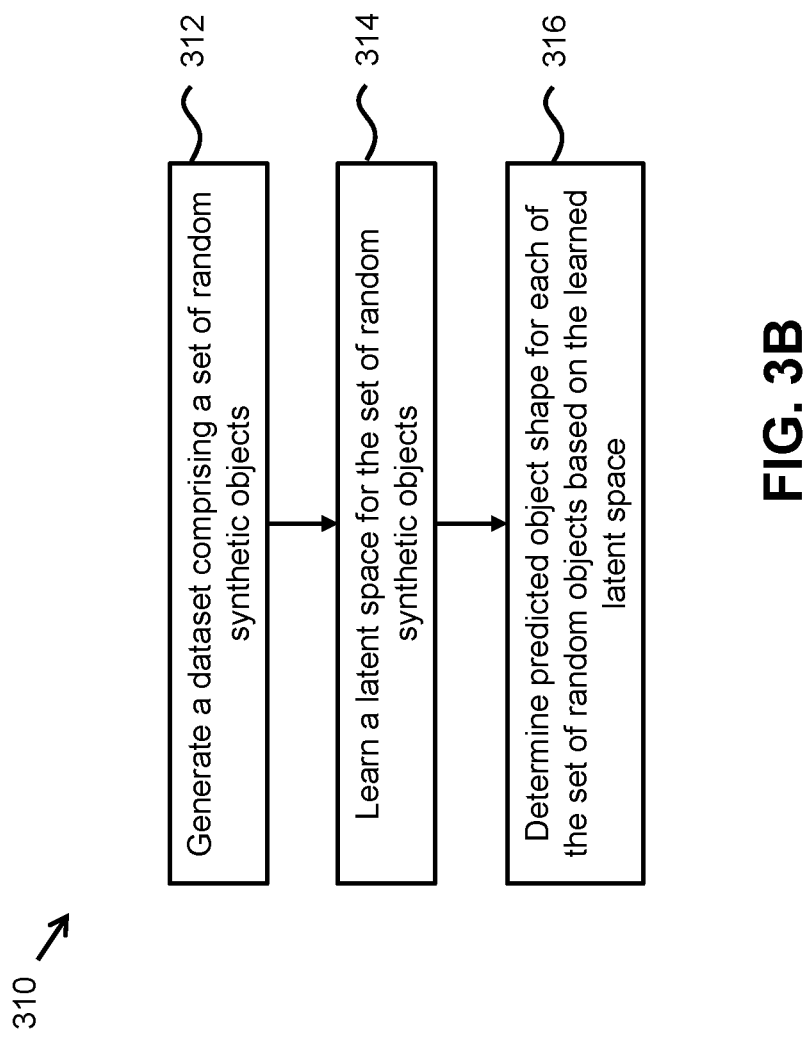
FIG. 3B illustrates an example method for training a control policy to adapt for different synthetic objects, according to an embodiment of the present disclosure.

Referring to FIG. 3B, there is shown an example method 310 for training the control policy 118a to adapt for different synthetic objects, according to some example embodiments. In particular, the control policy 118a is trained to generate a latent space for different synthetic object parameters and a state-action mapping for different synthetic objects having, such as different sizes and shapes. For example, the unitary property 118b of the unitary object may correspond to a cubical box having each side of 9 cm. Subsequently, the control policy 118a is trained to adapt for different object shapes and sizes different from the unitary shape (i.e., cubical) and unitary size (i.e., 9 cm×9 cm×9 cm) of the unitary object.

At 312, a dataset comprising a set of random synthetic objects is generated. The set of random synthetic objects may include synthetic objects having random object shapes. The random object shapes may be different from a unitary shape of the unitary object.

In an example, the set of random synthetic objects may be generated synthetically, for example, by generating synthetic depth images. Based on the synthetic depth images, object shapes different from the unitary shape may be identified. To this end, the synthetic objects may have random object shapes different from the unitary shape, i.e., cube, of the unitary object. For example, the random object shapes of the synthetic objects may include, but is not limited to, rectangle, cylinder, sphere, cone, frustum, prism, pyramid, peg, and other real-world shapes that may be an amalgamation of several different shapes. To this end, the synthetic depth images may indicate different shapes of the synthetic objects.

In an example, the dataset is further generated by generating a number of synthetic depth images of randomly sized objects for each synthetic random object shape. For example, 100 random synthetic object sizes may be generated for a cuboidal object shape. The generated dataset may be represented as $D:=\{I_i, c_{\{obj,i\}}, s_{\{obj,i\}}\}_i^{\{400\}}$ where $I_i$ are the depth images of each synthetically generated object of a different object shape and $s_{\{obj,i\}}=[l_x, l_y, l_z]$ are the synthetic sizes for different object shapes, recorded as labels, and $c_{\{obj,i\}}$ are the synthetic random object shapes or classes. Then, D is augmented ten times to 4000 data points by applying random translations, rotations, and Gaussian noise to each original data point to generate the dataset.

At 314, a latent space for the set of random synthetic objects is learned based on a difference between each of the random synthetic object shapes and the unitary shape, and the random synthetic object sizes and the unitary size. For example, an object feature extraction network, represented as F(f|I), may learn synthetic object parameters, f, of the set of random synthetic objects based on the synthetic object depth images, I. The synthetic object parameters, f, of the set of random synthetic objects may indicate the random shapes and sizes of the synthetic objects. In an example, the object feature extraction network may be a convolution neural network. For example, the object feature extraction network processes each of the synthetic object depth images, I, and outputs a mean and a standard deviation of each of the synthetic object properties, represented as $f_{\{mean\}}$ and $f_{\{std\}}$, respectively, In an example, the object feature extraction network may generate encoding of the random shapes and sizes of the synthetic objects in the latent space. For example, the object feature extraction network uses ResNet-18 architecture to process the synthetic object depth images.

According to an example embodiment, the object feature extraction network may include a variational auto-encoder (VAE) for re-parameterization to sample the synthetic object parameters, f, of the set of random synthetic objects. In an example, the VAE may enable dimensionality reduction of the synthetic object parameters of the set of random synthetic objects. In an example, the VAE may produce a new synthetic object parameter from old synthetic object parameter for the set of random synthetic objects, for example, by selection or by extraction. As may be understood, the VAE may be trained in a regularized manner to avoid over fitting and ensure that the latent space has good properties corresponding to the synthetic object parameters that enable generative process. In this manner, the latent space for representing the synthetic object parameters in lower dimension may be learned.

At 316, a predicted object shape for each of the set of random synthetic objects may be determined based on the learned latent space. As may be noted, the learned latent space may represent the synthetic object parameters corresponding to each of the set of random synthetic objects. In an example, a linear layer associated with the object feature extraction network outputs a predicted object size $\hat{s}_{\{obj\}}$ and logits for a predicted object shape $\hat{c}_{\{obj\}}$ for the set of random synthetic objects. A loss function may be used to train the object feature extraction network to predict the synthetic object shapes of the random synthetic objects. The loss function may be represented as:

$$L = L_{\{shape\}} + L_{\{class\}} + \beta L_{\{KL\}} =$$
$$\|s_{\{obj\}} - \hat{s}_{\{obj\}}\|^2 + L_{\{CE\}}(c_{\{obj\}}, \hat{c}_{\{obj\}}) + \beta D_{\{KL\}}(N(f_{\{mean\}}, f_{\{std\}}), N(0, 1))$$

where $L_{\{CE\}}$ is a cross entropy loss and $\beta$ is a weight on KL divergence loss.

In an example, supervised learning may be used to predict the synthetic object sizes and shapes of the set of random synthetic objects. The first two terms of the loss regulates the supervised learning for the prediction. Moreover, the KL divergence loss regulates the learned feature space and mitigates over-fitting.

FIG. 3C shows an example method 320 for generalizing the control policy 118a with the state adapter model 118c and the action adapter model 118d, according to some embodiments of the present disclosure. In particular, the state adapter model 118c and the action adapter model 118d are trained to learn to generalize the control policy 118a for generating action for different objects.

Some embodiments of the present disclosure are based on the recognition that if a new object is represented by a same Markov Decision Process, MDP, as the MDP defined for the unitary object, the control policy 118a may get an input indicating a current state of the new object. However, an output action generated by the control policy 118a for the new object may not be suitable for the new object as the action may be selected based on the unitary property 118b of the unitary object. Some embodiments of the present disclosure are also based on the recognition that, in certain cases, an object property and a trajectory of action of a new object during a manipulation operation may be similar to the unitary property and the action generated for the unitary object. Subsequently, a new action for the new object may be described by trivial transformations in the latent space of encoding of unitary property and/or a state-action mapping.

In an example, the control policy 118a may include a state space comprising encoding of different states of the unitary object. Moreover, the control policy 118a may include an action space comprising encoding of different actions that may be performed on the unitary object for manipulating the unitary object according to a task. Further, the control policy 118a may include a mapping between the state space and the action space indicating one or more actions for a particular state of the unitary object.

At 322, one or more linear transformations are learned by the state adapter model 118c to produce a state correction to a state of the unitary object for a synthetic object. The state adapter model 118c enables for adaption of the control policy 118a. The state adapter model 118c is configured to produce the state correction for a state of a synthetic object having a synthetic object parameter different from the unitary property 118b.

In this regard, the state adapter model 118c may take as input the synthetic object parameter, f, of the synthetic object and outputs a diagonal matrix indicating state properties of the synthetic object. For example, the state properties may indicate extension or space occupied by the synthetic object in its current state in different directions, namely X, Y and Z directions. The state dimensions of the synthetic object may be used to project a latent space of the current state of the synthetic object on to a latent space of a state of the unitary object.

In particular, the projection of the latent space of the synthetic object on to the latent space of the state of the unitary object may indicate a difference in synthetic object parameter of the synthetic object with respect to the unitary property 118b of the unitary object. In an example, the difference between the synthetic object parameter and the unitary property 118b may be based on shape, size, weight, texture, material, density, and so forth. For example, the current state of the synthetic object may be mapped to an initial state, i.e., before manipulation operation, of the unitary object. Based on the difference between the synthetic object parameter of the synthetic object and the unitary property 118b of the unitary object in the projected latent space, the state correction for the synthetic object may be generated. For example, the state correction may indicate a required shift in the current state of the synthetic object to correct the state of the synthetic object to a desired state according to a task. The state correction may indicate, for example, a required angle or position or pose corresponding to one or more sides of the synthetic object.

To this end, the state adapter model 118c may be parameterized by $\phi$, and takes as input the synthetic object parameter f of the synthetic object to output a diagonal matrix $T_{\{s\}}$ of state properties corresponding to the synthetic object. The output is used as a linear operator to project a current state, s, of the synthetic object to the latent space similar to a state of the unitary object, $\bar{s}_u$. The projection may be represented as: $\bar{s}_u$: $\bar{s}_u = T_{\{s\}} s$.

Further, the state correction when applied on the synthetic object may result in corrected state of the synthetic object. The action for the synthetic object based on the synthetic object parameter is determined based on the trained action adapter model 118d.

At 324, one or more linear transformations are learned by the action adapter model 118d to produce an action correction to an action for the unitary object. The action adapter model 118d enables for adaption of the control policy 118a to produce a corrected action for the synthetic object based on an action for the unitary object and the corrected state. The action adapter model 118d is configured to produce the action correction for the action for the synthetic object having the synthetic object parameter different from the unitary property 118b. In this regard, the control policy 118a may be configured to produce a corrected action for the robotic manipulator 102 to manipulate the synthetic object having the synthetic object parameter based on the state correction generated by the state adapter model 118c and the action correction generated by the action adapter model 118d.

As may be noted, during training, the control policy 118a may learn to map a state of the unitary object to an action of the robotic manipulator 102 to manipulate the unitary object according to a task. For example, the task may be an assembly task, a packaging task, and so forth. Moreover, the action may be a pivoting action or a re-orienting action. In particular, the control policy 118a may learn to map a state space of the unitary object to an action space associated with the task. For example, based on the mapping, the control policy 118a may learn to identify the action required to be performed on the unitary object to change a current state of the unitary object to a desired state thereof. For example, such action generated by the control policy 118a may be agnostic to the synthetic object parameter, i.e., may be compatible for use for different synthetic objects having different parameters in terms of, for example, size, shape, material, density, weight, texture, and so forth.

Thereafter, when the control policy 118a is implemented on the synthetic object, the control policy 118a may generate a state space of the synthetic object based on the state correction and map the corrected state space with an action space generated for the unitary object. The corrected unitary object state $\bar{s}\_u$, i.e., corrected state corresponding to the synthetic object, produced by the state adapter model 118c, is fed into the control policy 118a. The control policy 118a may then generate an action for manipulating the synthetic object. The generated action may be represented as: $\bar{a}_u = \pi_\theta^u(\bar{a}_u | \bar{s}_u)$. In particular, the action for manipulation of the synthetic object may be generated by the control policy 118a based on the action space of the unitary object. Therefore, $\bar{a}_u$ needs to be transformed to work for the synthetic object.

In this regard, the action adapter model 118d is trained to output a diagonal matrix $T_a$ of action properties, given the synthetic object parameters and the corrected state space, f, $s_u$, respectively. The diagonal matrix may indicate transformations of the actions of the unitary object for the synthetic object across different directions, namely, X, Y and Z directions. The matrix $T_a$ is used to compute the manipulation actions: $a = T_a \bar{a}_u$ for the synthetic object. The action dimensions may be used to determine an action to be performed on the synthetic object to manipulate the synthetic object according to the task. To this end, an overall action inference process may be summarized as:

$$a = T_a \bar{a}_u = T_{\{a\}} \pi_\theta^u(\bar{a}_u | \bar{s}_u) = T_{\{a\}} \pi_\theta^u(\bar{a}_u | T_{\{s\}} s)$$

To transform the action generated by the control policy 118a, the action adapter model 118d is executed to produce an action correction to an action for the unitary object. Based on the action correction, a corrected action for the synthetic object may be identified. In particular, the action adapter model 118d is configured to produce the action correction to the action for the unitary object based on the corrected state for the synthetic object, the synthetic object parameter and the simulation environment during training.

In some embodiments of the present disclosure a policy gradient approach may be used to learn the state adapter model 118c and the action adapter model 118d to maximize a trajectory return of manipulating different objects. For example, after collecting a manipulation trajectory, $\tau$, of the synthetic object with synthetic object parameter $f$, the advantage functions of the state adapter model 118c and the action adapter model 118d—may be represented as:

$$\hat{A}_s = \frac{1}{T} \sum_{\{i=0\}}^{T} \gamma^i r_i;$$

$$\hat{A}_{at} = \sum_{i=t}^{T} \gamma^i r_i$$

where $\tau$ is represented as:

$$\tau = (s_1, a_1, T_{\{s\}}, T_a, f, r_1, \ldots, s_T, a_T, T_{\{s\}}, T_a, f, r_T),$$

$r_i$ is the reward at time i and $\gamma$ is the discount factor.

Further, an update may be applied for both the state adapter model 118c and the action adapter model 118d as:

$$L_s(f, T_s, \phi, \phi_{\{old\}}) = \min\left(\frac{\rho_{\{\phi\}}(f)}{\rho_{\{\phi_{\{old\}}\}}(f)}, \text{clip}\left(\frac{\rho_{\{\phi\}}(f)}{\rho_{\{\phi_{\{old\}}\}}(f)}, 1+\epsilon_s, 1-\epsilon_s\right)\right) A_s$$

$$L_a(f, s_u, T_a, \psi, \psi_{\{old\}}) =$$

$$\min\left(\frac{\rho_\psi(f, s_u)}{\rho_{\psi_{old}}(f, s_u)}, \text{clip}\left(\frac{\rho_\psi(f, s_u)}{\rho_{\{\psi_{old}\}}(f, s_u)}, 1+\epsilon_a, 1-\epsilon_a\right)\right) A\_a$$

where $$\frac{\rho_1(\cdot)}{\rho_2(\cdot)}$$

is the ratio of likelihood of two projections of latent space and $\epsilon_s$, $\epsilon_a$ are clipping factors for update. Further, the weights of the state adapter model 118c and the action adapter model 118d are updated or adapted for the synthetic object by:

$$\phi_{k+1} = \text{argmax}_\phi E_{(f, T_s) \sim \pi_{\phi_k}} L_s(f, T_s, \phi, \phi_k)$$

$$\psi_{k+1} = \text{argmax}_\psi E_{(f, s_u, T_s) \sim \pi_{\psi_k}} L_a(f, s_u, T_s, \psi, \psi_k)$$

In this manner, the likelihood of state adapter model 118c or action adapter model 118d with higher reward-to-go is maximized.

At 326, the control policy 118a is adapted for the synthetic object based on the learning. In this regard, transformations to the control policy 118a are learned based on the state adapter model 118c and the action adapter model 118d. Based on the state adapter model 118c and the action adapter model 118d, the RL control policy and the control policy 118a may be trained to adapt for new and/or unseen objects of real-world for manipulating such objects according to a task.

The generalization that the state adapter model 118c and the action adapter model 118d introduce allow performing the training only in simulation and generalizing the control policy 118a to new unseen objects with different shapes in the real world. This reduces the training time in the real world to null. The embodiments of the present disclosure may work for a variety of table top manipulation operations which could be: reorienting an object to a different orientation, pushing an object to a different location, grasping an object in a different location and with a different approach, sliding, tipping, rolling and throwing.

The present disclosure discloses techniques for learning the generalizable robotic skills for manipulating real-world objects from only simulation data. Specifically, the control policy 118a comprising neural network trained with reinforcement learning is trained on only a unitary object having a predetermined or predefined unitary property 118b, such as a unitary shape and a unitary size. The state adapter model 118c and the action adapter model 118d are then trained to adapt the control policy 118a for determining an action for manipulating different random objects based on the synthetic depth images of the random synthetic object.

The proposed framework of training the control policy 118a comprises learning to manipulate the unitary object based on reinforcement learning. Further, in order to extract low-dimensional object information from the high-dimensional synthetic object depth images of the set of random synthetic objects, the object feature extraction network comprising a neural network trained with, for example, supervised learning, is employed. The supervised learning in the object feature extraction network may be performed on the generated dataset collected in simulation to learn the latent space (or projection of latent space) by predicting object shape and size of the synthetically generated set of random synthetic objects.

In addition, the object-specific state adapter model 118c and the action adapter model 118d are learned to adapt the control policy 118a to a new object by adjusting the state and the action space. The state adapter model 118c and the action adapter model 118d may determine one or more linear transformations for the synthetic object parameters of the synthetic object from the unitary property. The state adapter model 118c and the action adapter model 118d c are learned with a policy-gradient based approach. Subsequently, the state adapter model 118c adjusts a state of the unitary object based on a state of a new object. Further, the action adapter model 118d alters an output of the control policy 118a according to the new object to improve controller 118 performance. The control policy 118a, the state adapter model 118c and the action adapter model 118d may include a corresponding neural network that may be trained entirely in the simulation environment, and transferred to a series of real-world manipulating tasks in zero-shot.

Figure 4:
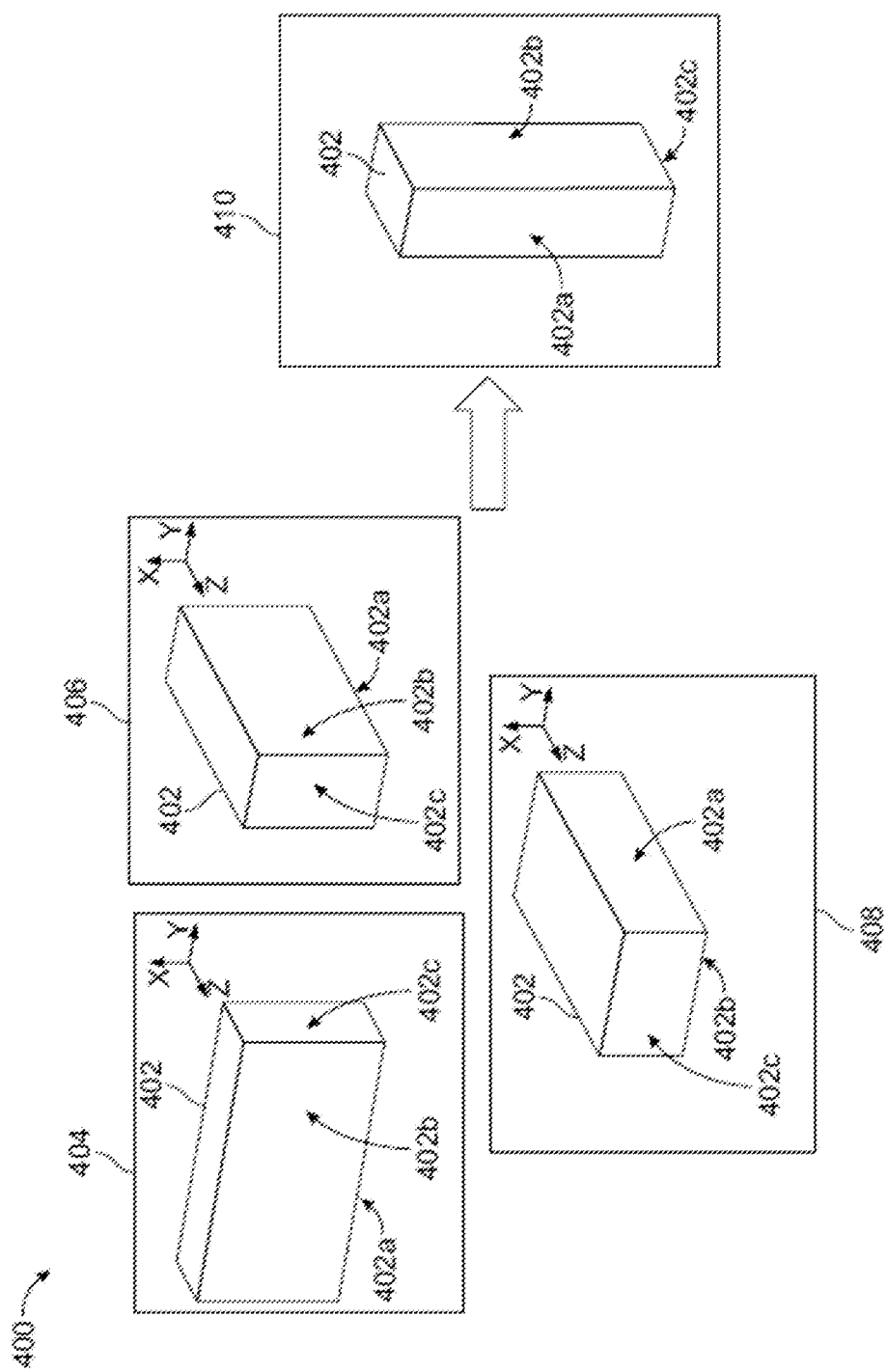
FIG. 4 illustrates an example illustration of different states of a unitary object, according to various embodiments of the present disclosure.

FIG. 4 shows an example illustration 400 of different states of a unitary object 402, according to some example embodiments. For example, the unitary object 402 may have a cuboidal shape, i.e., a unitary shape may be cuboid. Further, a unitary size of the unitary object 402 may be 90×50×40 cm³. It may be noted that such representation of the unitary shape and the unitary size of the unitary object 402 is only exemplary and should not be construed as a limitation. In other embodiments, the unitary object 402 may have any predefined unitary shape and unitary size.

The illustration 400 shows the different states of the unitary object 402. In 404, a state of the unitary object 402 indicates that a narrow longitudinal side 402a of the unitary object 402 is lying downwards and a wide longitudinal side 402b of the unitary object 402 is extending vertically. Moreover, in 404, an end side 402c of the unitary object 402 is inclined towards a Y-axis. Further, in 406, a state of the unitary object 402 indicates that the narrow longitudinal side 402a is lying downwards and the wide longitudinal side 402b of the unitary object 402 is extending vertically, while the end side 402c of the unitary object 402 is inclined towards a Z-axis. Further, in 408, a state of the unitary object 402 indicates that the wide longitudinal side 402b is lying downwards and the narrow longitudinal side 402a is extending vertically, while the end side 402c is facing towards the Z-axis.

Pursuant to present example, a desired state of the unitary object 402 is a state 410. In 410, a state of the unitary object 402 indicates that both the narrow longitudinal side 402a and the wide longitudinal side 402b are extending vertically upwards and the end side 402c of the unitary object 402 is lying downwards.

To this end, the states 404, 406 and 408 may not be a desired state of the unitary object 402 for a task or a step of an operation, such as an assembly task, a packaging task, and $s_o$ forth. Subsequently, a current state, for example, any of the states 404, 406, and 408, of the unitary object 402 may have to be changed prior to performing the task. For example, the desired state 410 of the unitary object 402 may be predefined according to the task, i.e., as per task settings. Further, the control policy 118a may learn to map the current state of the unitary object 402 with a required action to achieve the desired state 410 of the unitary object 402. Based on the identified action, the controller 114 may generate certain action parameters to control the gripper 108 of the robotic arm 104a. In this manner, the robotic manipulator 102 may perform the action to manipulate the unitary object 402, i.e., modify the current state of the unitary object 402 to achieve its desired state 410. Further, the control policy 118a is generalized using the state adapter model 118c and the action adapter model 118d to determine a required action for manipulating different unseen objects. Once trained, the generalized control policy 118a may apply learning to new unseen real-world objects and manipulate them.

A manner in which the control policy 118a is trained to manipulate the unitary object 402 according to the task and adapt or transform the control policy 118a for new unseen objects different from the unitary object 402 has been discussed in detail in conjunction with FIG. 2, FIG. 3A, FIG. 3B, and FIG. 3C. Therefore, the steps for training the control policy 118a, and learning the state adapter model 118c and the action adapter model 118d is not described here for brevity.

Figure 5:
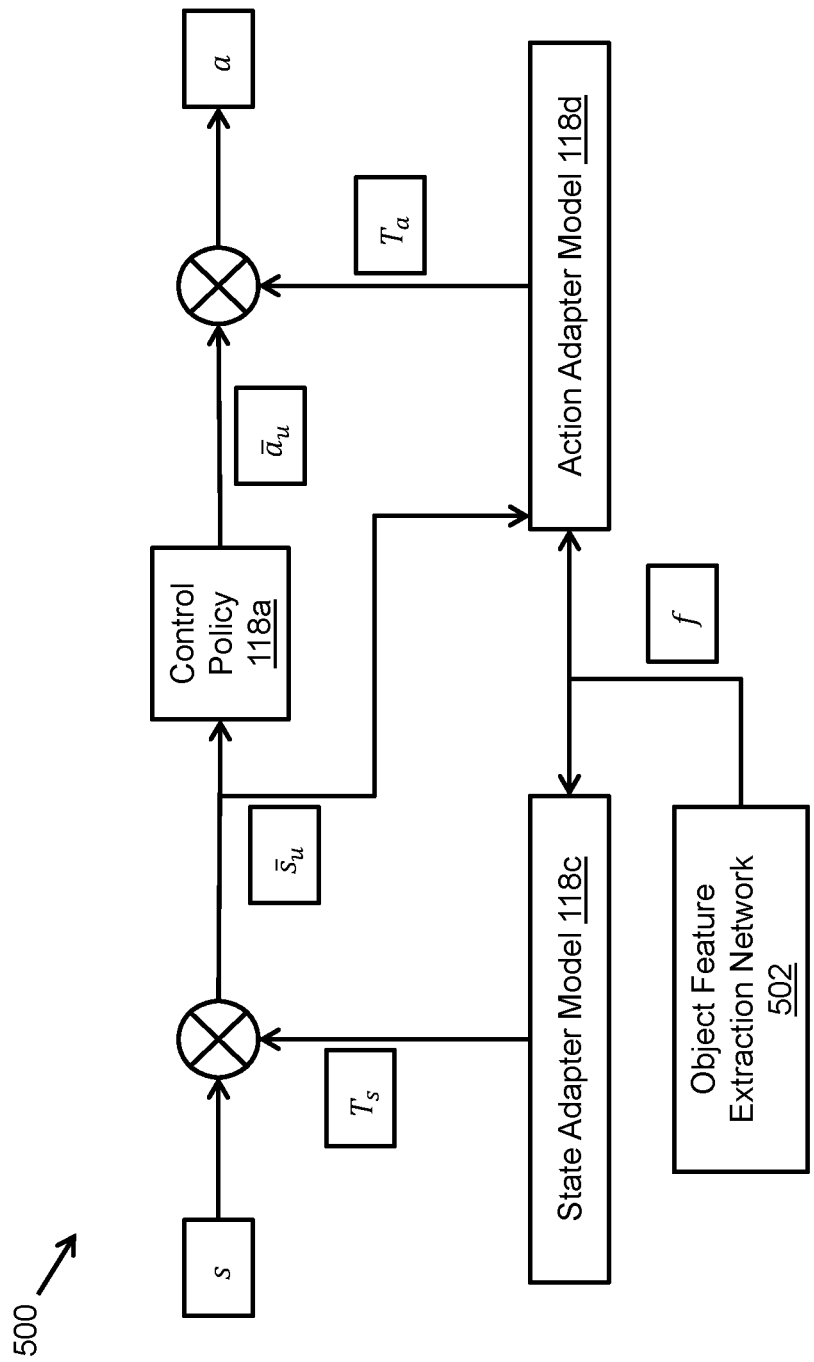
FIG. 5 illustrates a block diagram for training a control policy, according to an embodiment of the present disclosure.

FIG. 5 illustrates a block diagram 500 for training the control policy 118a, according to some example embodiments. The control policy 118a may be trained to perform a manipulation operation on different objects. The manipulation operation may include, for example, pivoting objects, re-orienting objects, insertion, and so forth.

In this regard, a simulation environment is created. For example, the simulation environment may include a simulation of the gripper 108, a simulation of the unitary object 402, and simulation of external surfaces, such as the contact surface 124 and the table-top 126. In an example, the simulation environment may be created on a physic engine. Examples of the physic engine may include, but is not limited to, Mujoco, Bullet, and Drake.

In the simulation environment, synthetic depth images may be generated of a set of random synthetic objects. The synthetic depth images may indicate different random object shapes and/or random object sizes for training the control policy 118a. Such random object shapes and/or random object sizes may be different from the unitary shape and the unitary size of the unitary object 402. The random object shapes of the set of random synthetic objects may include, for example, cuboid, sphere, prism, pyramid, cone, peg-shaped, and so forth. Further, the synthetic depth images of the set of random synthetic objects may be generated corresponding to different training object classes, such that the random synthetic objects may have different sizes, material property, texture, density, and so forth.

Further, RL framework parameters for the control policy 118a are defined for the simulation environment. For example, the control policy 118a $\pi_\theta^u(a|s)$ is parameterized by $\theta$ and mathematically defined by an MDP:={S, A, R, T, $\gamma$}. To this end, the control policy 118a is defined based on the unitary property 118b of the unitary object 402 and may not apply to the set of random synthetic objects. Therefore, the control policy 118a needs to be generalized to update the parameters of the control policy 118a for new objects.

In order to train and generalize the control policy 118a, a latent space of synthetic object parameters of the set of random synthetic objects is learned. In this regard, first, a latent space is created to represent the unitary property 118b of the unitary object 402. For example, a deep neural network of the control policy 118a may be used to generate the latent space for the unitary property 118b. For example, to generate encoding of the synthetic object parameters of the set of random synthetic objects, a supervised machine learning model of an object feature extraction network 502 may be used.

In an example, the object feature extraction network 502 may be denoted as: F(f|I). The object feature extraction network may learn the synthetic object parameters, f, of the set of random synthetic objects based on the synthetic object depth images, I. In an example, the object feature extraction network 502 may be implemented by a Resnet18 network to process the synthetic object depth images I and outputs a mean $f_{\{mean\}}$ and a standard deviation $f_{\{std\}}$ of the synthetic object parameters, f. Moreover, the object feature extraction network 502 may include an auto-encoder or a VAE to sample the synthetic object parameters f. Further, the object feature extraction network 502 may include a linear layer that receives the mean $f_{\{mean\}}$ and the standard deviation $f_{\{std\}}$ of the synthetic object parameters and outputs a predicted object size $\hat{s}_{\{obj\}}$ and a predicted object shape or class $\hat{c}_{\{obj\}}$ for each of the set of random synthetic objects. Accordingly, loss function for the object feature extraction network 502 may be modeled to regulate errors due to cross-entropy, KL divergence, and other supervised learning losses.

Further, one or more linear transformations are learned to adjust the state adapter model 118c and the action adapter model 118d. The state adapter model 118c and the action adapter model 118d allow the control policy 118a to be generalized. In particular, the state adapter model 118c and the action adapter model 118d allow the control policy 118a to generate actions for new unseen objects for manipulation, such as the random synthetic objects or a new real-world object.

The state adapter model 118c is parameterized by $\phi$, and takes as input the synthetic object parameter, f, of a random synthetic object. The state adapter model 118c outputs a diagonal matrix $T_{\{s\}}$ indicating state properties of the synthetic object. The output is used as a linear operator to project the state, s, of the synthetic object to a state space relating to a state of the unitary object $\bar{s}_u$: $\bar{s}\_u=T_{\{s\}}s$. The projected state $\bar{s}\_u$ is fed into the control policy 118a to generate an action as: $\bar{a}_u=\pi_\theta^u(\bar{a}_u|\bar{s}_u)$.

Further, the action adapter model 118d takes as input the synthetic object parameter, f, of the synthetic object along with the diagonal matrix $T_{\{s\}}$ of the state, s, of the synthetic object projected in the state space of the unitary object. The action adapter model 118d is trained to output a diagonal matrix $T_a$ of action properties given f, and $s_u$. Based on the output, the control policy 118a may determine a manipulation action, $a=T_a\bar{a}_u$, specifically for the synthetic object. Moreover, based on the manipulation action for manipulating the synthetic object, the controller 114 may generate a manipulation trajectory and/or action parameters to control the robotic manipulator 102 for performing the manipulation action. After the robotic manipulator 102 performs the manipulation action on the synthetic object, advantage functions of the state adapter model 118c and the action adapter model 118d are determined. The advantage functions include a reward for the RL framework of the control policy 118a. Based on the reward, the control policy 118a, the state adapter model 118c and the action adapter model 118d may re-adjust its weights and get trained.

Figure 6:
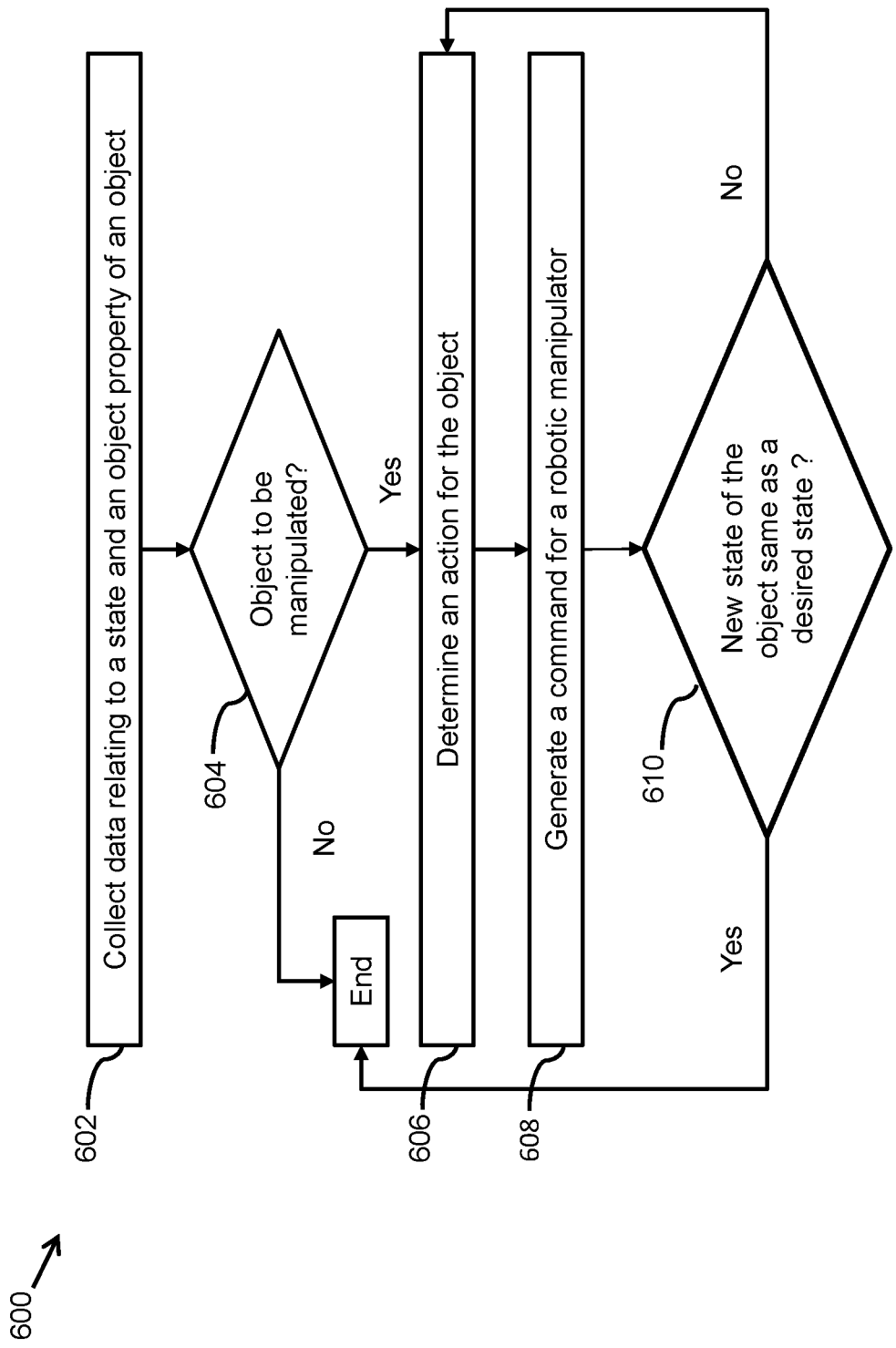
FIG. 6 illustrates an example method for performing a desired manipulation task on a new object, according to an embodiment of the present disclosure.

FIG. 6 shows an example method 600 for performing a desired manipulation task on a new object, according to some embodiments of the present disclosure. The manipulation task may be performed by the robotic manipulator 102 based on a manipulation action generated by the control policy 118a having the RL-based neural network. As described above, the control policy 118a may be trained on the unitary object 402 having the predefined unitary property 118b. The control policy 118a learns to map a state of the unitary object 402 to an action for the unitary object 402. The control policy 118a may be adapted or transformed to determine action for manipulating a new unseen object using the state adapter model 118c and the action adapter model 118d.

At 602, data relating to a state of an object and an object property of an object is collected. In an example, the object may be a part of an assembly and may be transferred on a conveying line for assembly process. In this regard, a desired state of the object may be a pre-condition for an assembly step of the assembly process. Subsequently, if the state of the object is not satisfying the pre-condition for the assembly step, the object may have to be manipulated, such as re-oriented. The object may be, for example, a peg, a book, a bottle, a soap dispenser, a ball, a cup, a glass, or a part of any object.

In an example, one or more sensors may be used to collect the data of the real-world object. It may be noted, various sensors, such as the force sensor 110, the visual sensor 112, a pressure sensor, and so forth may be coupled to the robotic manipulator 102 to acquire different object property of the object. Pursuant to present example, the data may be collected by the visual sensor 112 of the robotic manipulator 102. In such a case, the visual sensor 112 may capture a depth image of the object. Further, based on the depth image, the state and the object property of the object may be identified. In an example, the state may indicate a pose or an orientation of the object. Further, the object property of the object may indicate at least one of shape, size, density, weight, material, and/or texture of the object.

At 604, a determination is made to check whether the object needs to be manipulated. For example, the determination may be made based on a comparison between the identified state, i.e., current state, of the object and the desired state of the object as pre-condition for the assembly step.

In an example, if the identified state of the object is same as the desired state of the object, then manipulation of the object may not be required. In such a case, the object may be transferred or moved further for performing the assembly step, and the method 600 for manipulating the object may end. However, if the identified current state of the object is not same as the desired state, the method 600 may move to 606.

At 606, an action is determined for the object. In this regard, the controller 114 may receive the measurements 111 from the visual sensor 112, the force sensor 110 and/or other sensor coupled to the robotic manipulator 102 indicative of the state and the object property of the object. The controller 114 may trigger the trained control policy 118*a* to generate a required action for manipulating the object, for example, to re-orient or pivot the object from the current state to the desired state. The control policy 118*a* may be adapted or transformed for the object, based on the object property. In this regard, the state adapter model 118*c* and the action adapter model 118*d* may transform the control policy 118*a* for producing a corrected action for performing the manipulation operation for the object. The transformed control policy 118*a* may generate the corrected action for the object.

At 608, a command is generated for the robotic manipulator 102. In an example, the command may include action parameters for controlling the end-tool 106 and/or the gripper 108 of the robotic arm 104*a* of the robotic manipulator 102, such that the end-tool 106 and the gripper 108 perform the determined action on the object. For example, the controller 114 is configured to compute and transmit the command or control action for manipulating the object, based on the corrected action determined by the control policy 118*a*. The controller 114 may send the command to a low-level robot controller of the robotic manipulator 102. The robotic manipulator 102 then applies the command on the object to manipulate the object.

At 610, a determination is made to check if a new state of the object is same as the desired state. For example, one or more sensors associated with the robotic manipulator 102 may be used to identify the new state of the object.

Further, if the new state of the object is same as the desired state, the method 600 may end. However, if the new state of the object is not same as the desired state, then the method 600 may go back to 606. In such a case, another action may be determined for manipulating the object.

FIG. 7A, FIG. 7B, FIG. 7C and FIG. 7D show examples of a controlled trajectory for manipulating objects during a manipulation operation, according to various example embodiments. For example, a series of action steps may be performed to complete an action of manipulating an object. For example, if the desired state of the object is the vertically upwards state 410, then the object may be re-oriented from other states, such as the states 404, 406 and 408 to the vertically upwards state 410.

Figure 7A:
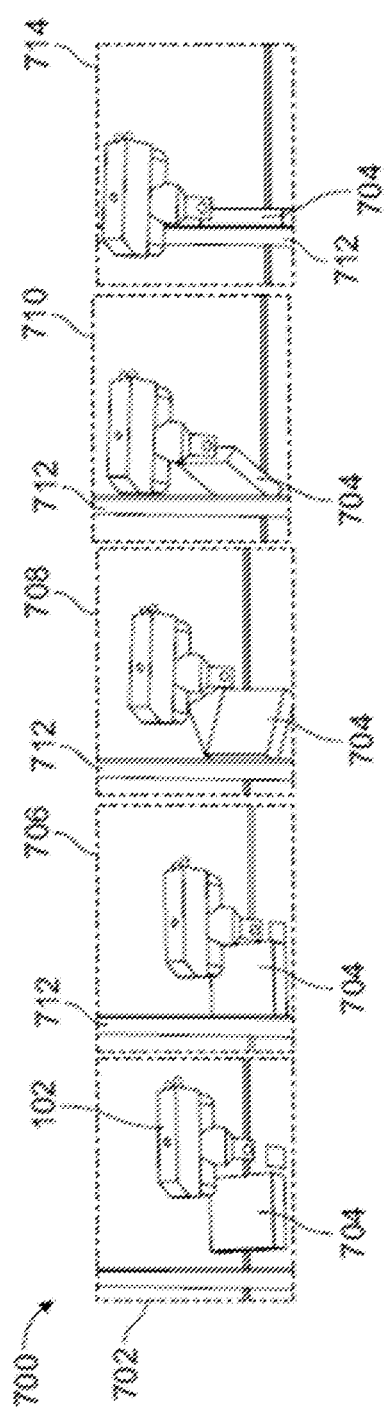

Referring to FIG. 7A, there is shown a series of action steps learnt by the control policy 118*a* while manipulating a unitary object 704. For example, as shown in 702, the unitary object 704 is laying down. Further, as shown in 706, an action of re-orienting the unitary object 704 is triggered and control commands are given to the gripper 108 and the end-tool 106 of the robotic manipulator 102. As shown in 708 and 710, the gripper 108 establishes a contact with the unitary object 704, and the end-tool 106 may move to reorient the unitary object 704 by fixing one side of the unitary object 704 against a contact surface 712 and moving or pivoting another side of the unitary object 704 to bring the unitary object 704 in vertically upwards state. At 714, the vertically upwards state, i.e., a desired state, of the object 704 is reached. For example, the control policy 118*a* may learn a state-action mapping between state space and action space for manipulating the unitary object to a desired state, during training thereof.

In an example, the action steps performed by the gripper 108 may include the following steps. The gripper 108 first pushes the unitary object 704 towards the contact surface 712, such as a wall to establish a contact between the unitary object 704 and the gripper 108, and between the unitary object 704 and the wall 712. Then, the robotic arm 104*a* or the end-tool 106 moves upwards while pushing the unitary object 704 to the wall 712 to start pivoting the unitary object 704. After the unitary object 704 rotates over a certain angle, the robotic arm 104*a* or the end-tool 106 applies downward forces to maintain contact with the unitary object 704, which is a robust way to stabilize the unitary object 704 and prevent the unitary object 704 from dropping off. Finally, the unitary object 704 is flipped up and standing on the table in the vertically upwards state.

Figure 7B:
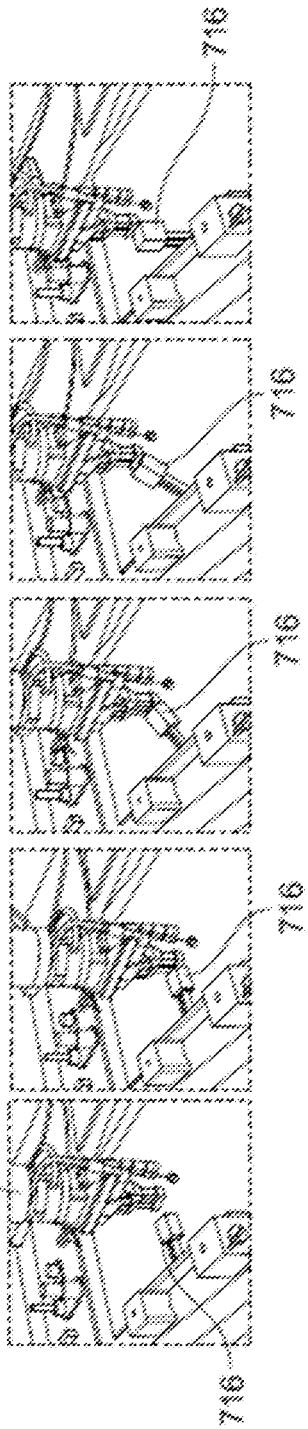

Referring to FIG. 7B and FIG. 7C, the control policy 118*a* determines manipulation trajectory for synthetic objects during training. Once the control policy 118*a* learns to determine an action required to manipulate the unitary object 704, i.e., how to re-orient the unitary object 704 in the desired state, control policy 118*a* may learn to apply the action to different synthetic objects, depicted as a synthetic object 716 and a synthetic object 718 (collectively referred to as synthetic objects 716 and 718, hereinafter). For example, the control policy 118*a* may learn to establish a contact between the robotic manipulator 102 and the different kinds of synthetic objects 716 and 718 and move the different kinds of synthetic objects 716 and 718 having different shapes and sizes to achieve the desired state, i.e., the vertically upwards state. A manner in which the synthetic objects 716 and 718 are manipulated or re-oriented to achieve the desired vertically upwards state is shown in 720 and 722, respectively. The action steps and manner of movement of the robotic arm 104*a*, the end-tool 106 and the gripper 108 applied on the synthetic objects 716 and 718 are similar to the action steps learned during pivoting the unitary object 704.

FIG. 7D illustrates an example illustration 724 indicating a series of action steps, poses and contact configurations between the gripper 108 and/or the end-tool 106 of the robotic manipulator 102 and a real-world object 726. For example, the control policy 118*a* trained on the unitary object 704 and the synthetic objects 716 and 718 is transformed based on object property of the object 726 and the state adapter model 118*c* and the action adapter model 118*d*. Subsequently, the control policy 118*a* generates the series of action steps 728, 730, 732 and 734 for manipulating the object 726. As shown, at step 728, the object 726 is laying down and its state is not same as the desired state, i.e., vertically upwards state. Further, at step 730 and 732, the gripper 108 may establish a contact with the object 726, fixes one side of the object 726 against a wall 736 and moves another side of the object 726 to achieve the vertically upwards state. At step 734, the vertically upwards state is achieved.

It may be noted that the desired state of all objects 704, 716, 718 and 720 to be vertically upwards state is only exemplary and should not be construed as limiting. The control policy 118*a* may learn different state-action mappings, wherein the unitary object 704 may have different desired states according to tasks and different initial or current states. In particular, the desired state may be determined based on a pre-condition or actions instructions of a next action step of the task or operation process. Further, the control policy 118*a* may also learn different possible states of the unitary object 704 and corresponding action to manipulate the unitary object 704 to desired states.

Moreover, the action to achieve the vertically upwards state, i.e., the pivoting action of fixing one side of an object against a surface and moving another side of the surface to reach the vertically upwards state is only illustrative and should not be construed as a limitation. For example, such reorientation of the object may be required when the object being manipulated is not easy to grasp in its current state and the object is not in the desired state. However, in other examples, a different action may be identified to reorient the object to achieve the desired state.

Figure 8:
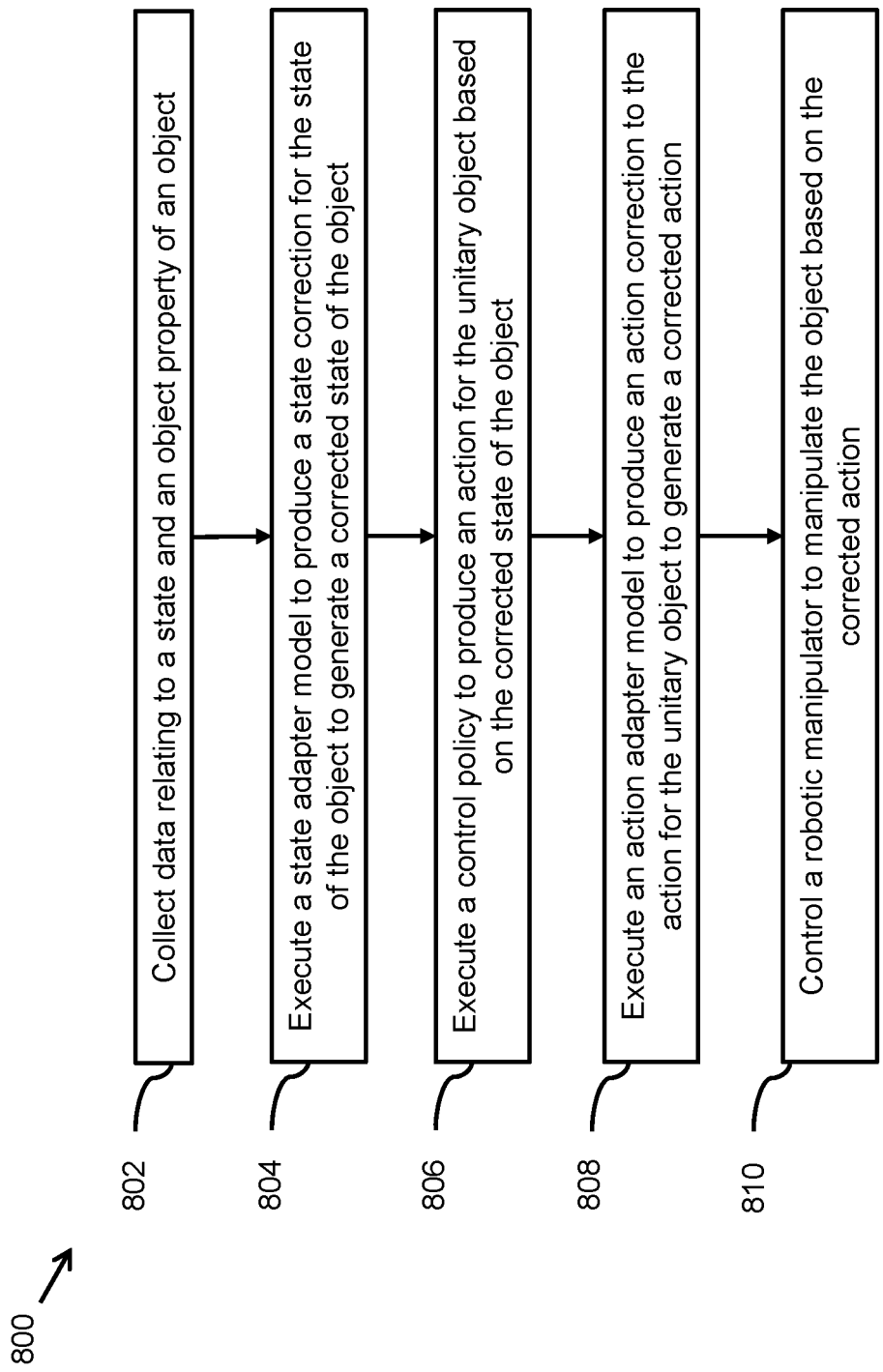
FIG. 8 illustrates an example method for performing a desired manipulation task on a new real-world object, according to an embodiment of the present disclosure.

FIG. 8 illustrates an example method 800 for performing a desired manipulation task on a new real-world object, according to an embodiment. The method 800 may be performed on the real-world object 726, after the training of the control policy 118*a*, the state adapter model 118*c* and the action adapter model 118*d*. As may be noted, the control policy 118*a* learns to manipulate a unitary object, such as the unitary object 704 or 402. Moreover, the control policy 118*a* is generalized by the trained state adapter model 118*c* and the trained action adapter model 118*d* to adapt or transform the control policy 118*a* trained on the unitary object 402 or 704 for different objects. Such transformation of the control policy 118*a* is achieved based on linear transformations of the state adapter model 118*c* and the action adapter model 118*d* according to object property of new objects.

In particular, the control policy 118*a* may generate a corrected action for the robotic manipulator 102, such that by performing the action the robotic manipulator 102 manipulates the object 726. For example, the robotic manipulator 102 comprises the robotic arm 104*a* having the end-tool 106 and the gripper 108. In an example, the robotic arm 104*a* may be controlled in impedance control mode with a predefined stiffness in all the directions. For example, the predefined stiffness may be in a range of 5 N/mm to 20 N/mm. Pursuant to present example, the predefined stiffness for the robotic arm 104*a* may be 12 N/mm.

In this regard, at 802, data relating to a state and an object property of the object 726 is collected. The data may be collected by one or more sensors, such as the visual sensor 112, the force sensor 110, and so forth coupled to the robotic manipulator 102. In an example, the robotic manipulator 102 may include sensors coupled to the robotic arm 104*a*. For example, the force sensor 110 and the visual sensor 112 may be coupled to the robotic arm 104*a*. The force sensor 110 may be mounted on the end-tool 106 above the gripper 108, and the force sensor 110 may measure external forces experienced by the robotic arm 104*a*.

In addition, the visual sensor 112 may include, for example, an RGB-D (RGB-depth) camera. The RGB-D camera may capture a depth image of the object 726. Based on the depth image, the object property of the object 726 may be identified for state estimation of the object 726. The object property may include, for example, shape, size, weight, density, material property, texture, pose, orientation, position, and so forth. In one example, tracking tags may be placed on the object 726 to obtain high-accuracy state information of the object 726. In such a case, the state information may be considered a ground-truth object pose or orientation of the object 726. In another example, a vision-based 6D pose estimation techniques may be used for mask and deep feature extraction of the object 726 and pose tracking of the object 726. To this end, the object property of the object 726 may be extracted by applying processing techniques on the obtained depth image, measured forces, or measurements from other sensors associated with the robotic arm 104*a*.

Thereafter, at 804, the state adapter model 118*c* is executed to produce a state correction to the state of the object 726 to generate a corrected state of the object 726 based on the collected data. The state adapter model 118*c* enables for adaption of the control policy 118*a*. The state adapter model 118*c* is configured to produce the state correction for the state of the object 726 having the object property different from the unitary property.

In an example, the state adapter model 118*c* takes as input the object property of the object 726 and outputs a diagonal matrix indicating state properties of the object 726. For example, the state properties may indicate extension or space occupied by the object 726 in current state in different directions, namely X, Y and Z directions. The state properties of the object 726 are used to project a latent space of a current state of the object 726 to a latent space of a state of the unitary object 402 or 704.

In particular, the projection of the latent space of the object 726 to the latent space of the state of the unitary object 402 or 704 may indicate difference in the object property of the object 726 and the unitary property of the unitary object 402 or 704. In an example, the difference between the object property and the unitary property may be based on, for example, shape, size, weight, texture, material, density, and so forth. For example, the current state of the object 726 may be mapped to initial state, i.e., before manipulation operation, of the unitary object 402 or 704. Based on the difference between the object property of the object 726 and the unitary property of the unitary object 402 or 704 in the projected latent space, the state correction for correcting a state space as per the object 726 may be generated. For example, the state correction may indicate a required shift in an initial state of the unitary object 402 or 704 to reach the current state of the object 726. Further, the state correction may also indicate a required shift in the current state of the object 726 to correct the state of the object 726 to a desired state according to a task. The state correction may indicate, for example, a required angle or position or pose corresponding to one or more sides of the object 726.

In an example, projected latent space for the object 726 and the unitary object 402 or 704 may be represented as: $l_x=[6, 5]$, $l_y=[1, 18.5]$, $l_z=[1, 15]$. In this case, the $l_x=6$, $l_y=1$ and $l_z=1$ indicates latent space of the state of the unitary object 402 or 704; and $l_x=5$, $l_y=18.5$ and $l_z=15$ indicates latent space of the current or initial state of the object 726. Based on a difference in the projection of the latent space of the initial state of the object 726 to the latent space of the initial state of the unitary object 402 or 704, the state correction may be generated. For example, the state correction may indicate a difference in the latent space of the current state of the object 726 from the latent space of the initial state of the unitary object 402 or 704, and a desired state change in state of the object 726 as: $l_x=18.5$, $l_y=15$ and $l_z=5$. Subsequently, the state correction when applied on the object 726 may result in corrected state space corresponding to the current state of the object 726. Further, the desired state of the object 726 is achieved by applying an action to manipulate the object 726. The action is determined based on the following steps.

At 806, the control policy 118a is executed to produce an action for the unitary object 402 or 704, based on the corrected state of the object 726. In particular, the control policy 118a may be configured to produce the action for the robotic manipulator 102 to manipulate the unitary object 402 or 704 having the predetermined unitary property such that the unitary object is in a state similar to the current state of the object 726.

During training, the control policy 118a may learn to map a state of the unitary object 402 or 704 to an action of the robotic manipulator 102 to manipulate the unitary object 402 or 704 according to the task. In particular, the control policy 118a may learn to map a state space of the unitary object 402 or 704 to an action space associated with the task. For example, based on the mapping, the control policy 118a may learn to identify an action required to be performed on the unitary object 402 or 704 to change the state of the unitary object 402 or 704 to a desired state thereof.

Thereafter, when the control policy 118a is implemented on the real-world object 726, the control policy 118a may generate a state space of the corrected state of the object 726 and map the state space with an action space generated for manipulating the unitary object 402 or 704. In particular, the action generated by the control policy 118a based on the mapping between the corrected state space for the object 726 and the action space of the unitary object 402 or 704 may have to be transformed to work on the object 726, due to difference in the object property and the unitary property.

To transform the action generated by the control policy 118a, at 808, the action adapter model 118d is executed to produce an action correction to the action for the unitary object 402 or 704 based on the difference between the unitary property and the object property. Based on the action correction, a corrected action for the object 726 may be generated. In particular, the action adapter model 118d is configured to produce the action correction to the action for the unitary object 402 or 704 based on the corrected state of the object 726 and the simulation environment during training of the action adapter model 118d In an example, the action adapter model 118d may output a diagonal matrix of action dimensions, i.e., actions for different directions, namely, X, Y and Z directions. The action dimensions may be used to determine action to be performed on the object 726 to perform the manipulation operation. For example, if a side of the object 726 is smaller in size and can be grasped easily, then the action correction may indicate grasping the side by the gripper 108 and moving the end-tool 106 while applying downward pressure to pivot or reorient the object 726.

For example, an action performed by the robotic manipulator 102 for manipulating the cubical unitary object having small size may be pivoting of the unitary object using external contact surfaces for an assembly task. In the present example, the object 726 may be pyramid-shaped, task setting of a task to be performed on the object 726 may be packaging requiring its apex to be in vertically-upwards orientation and the state correction indicates that the object 726 is lying downwards on a face thereof. In this case, the control policy 118a may determine an action of re-orienting or pivoting to be performed on the object for manipulating the object 726. However, the action may not be applied directly on the object 726 as the contact dynamics, class, etc. of the object 726 is different from the unitary property 118b. To address this, the action adapter model 118d may determine an action correction indicating re-orienting the object 726 by grasping the apex using the gripper 108 and moving the gripper robotic arm 104a along a horizontal axis to re-orient the object 726. Subsequently, corrected action may be generated based on the action correction that may be used to manipulate the object 726.

At 810, the robotic manipulator 102 is controlled to manipulate the object 726 based on the corrected action for the unitary object 402 or 704. In an example, the corrected action comprises action parameters for controlling an interaction between the robotic manipulator 102 and the object 726. For example, the action parameters may be generated for different parts of the robotic manipulator 102, such as rotation angle for the end-tool 106 and/or the robotic arm 104a, gripping force for the gripper 108, and the lift force, drag force, or tensor for the end-tool 106 and/or the robotic arm 104a, and so forth. Based on the action parameters, the robotic manipulator 102 may be controlled to manipulate or re-orient the object 726.

It may be noted that the example of learning pivoting operation on the unitary object 402 or 704 during training of the control policy 118a and generating the action for the object 726 as pivoting operation is only exemplary and should not be construed as a limitation. In other embodiments of the present disclosure, the control policy 118a may learn to perform different operations, such as pivoting, insertion, re-orienting, etc. on the unitary object 402 or 704 to achieve its desired state as per the task or next action step in a process. Further, the trained control policy 118a may produce any action such as pivoting, insertion, re-orienting, etc. for the object 726, based on a current state of the object 726, a desired state of the object 726, a task associated with the object 726, and/or the difference between the object property and the unitary property.

Figure 9A:
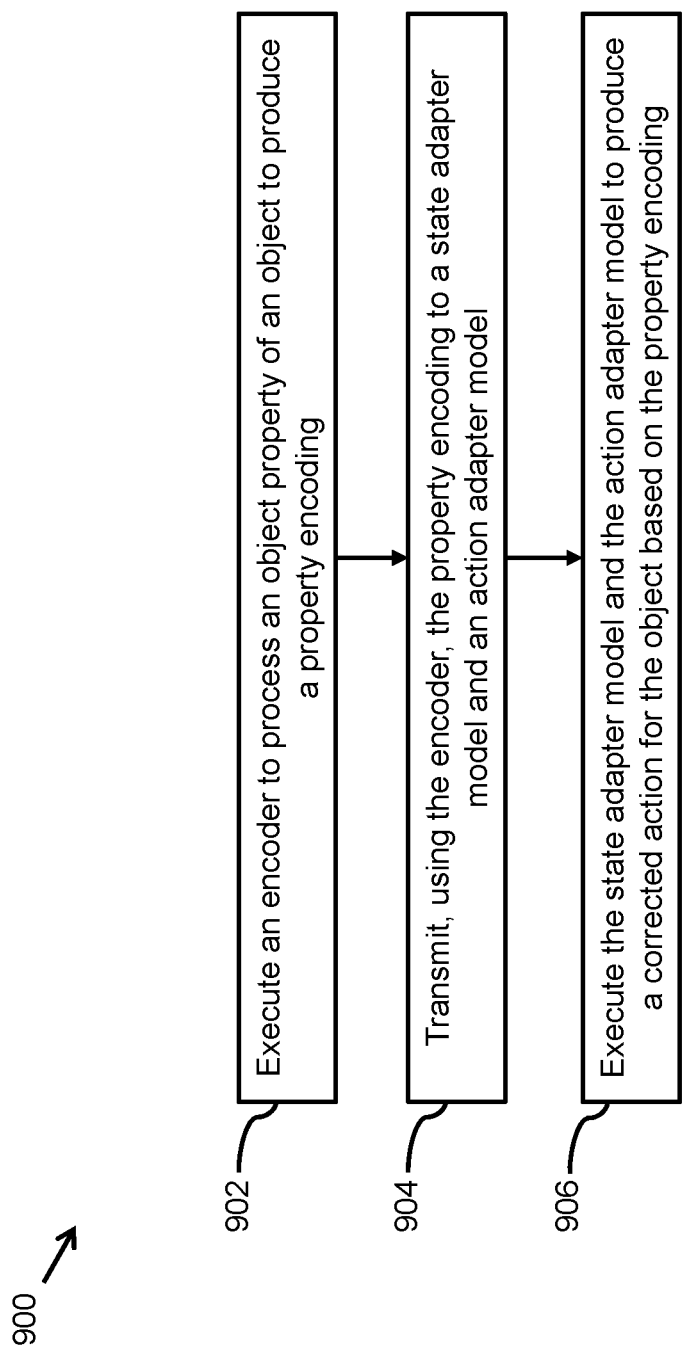
FIG. 9A illustrates an example method for generating a corrected action for the object, according to an embodiment of the present disclosure.

Referring to FIG. 9A, an example method 900 for generating a corrected action for the object 726 is illustrated, according to an embodiment.

At 902, an encoder is executed to process the object property of the object 726 to produce a property or feature encoding in a latent space. For example, the encoder may correspond to the object feature extraction network 502. Further, the property encoding may indicate shape, size, material, density, etc. of the object 726. In one example, the property encoding of the object property may be done in a latent space having the unitary property encoding. For example, the object property may be associated with an object shape and an object size of the object 726 and the unitary property 118b may be associated with a unitary shape and a unitary size of the unitary object 402 or 704. In an example, the property encoding in the latent space may represent a cluster of the object property encoding points, wherein the cluster corresponds to an object shape of the object 726, such as a non-linear cylinder and an object size. The encoding of the unitary property 118b in the latent space may indicate a cluster of the unitary property encoding, wherein the cluster corresponds to a unitary shape, such as cuboid and a unitary size.

At 904, the encoder transmits the property encoding to the state adapter model 118c and the action adapter model 118d. in particular, the encoder of the object feature extraction network 502 may transmit the property encoding of the object property to the state adapter model 118c and the action adapter model 118d. For example, the property encoding may indicate difference between the object property and the unitary property. The encoder may transmit the encoded object property in the latent space having the encoded unitary property 118*b* to the state adapter model 118*c* and the action adapter model 118*d*.

At 906, the state adapter model 118*c* and the action adapter model 118*d* are executed to produce a corrected state and a corrected action for the object 726. In particular, the state adapter model 118*c* may generate a state correction for the object 726 based on the property encoding and the encoding of the state of the unitary object 402 or 704. Moreover, the action adapter model 118*d* may generate an action correction for the object 726 based on the property encoding and the corrected state. In an example, the corrected action generated by the action adapter model 118*d* may be applied to the object 726 for manipulating the object 726 to a desired orientation or state.

Figure 9B:
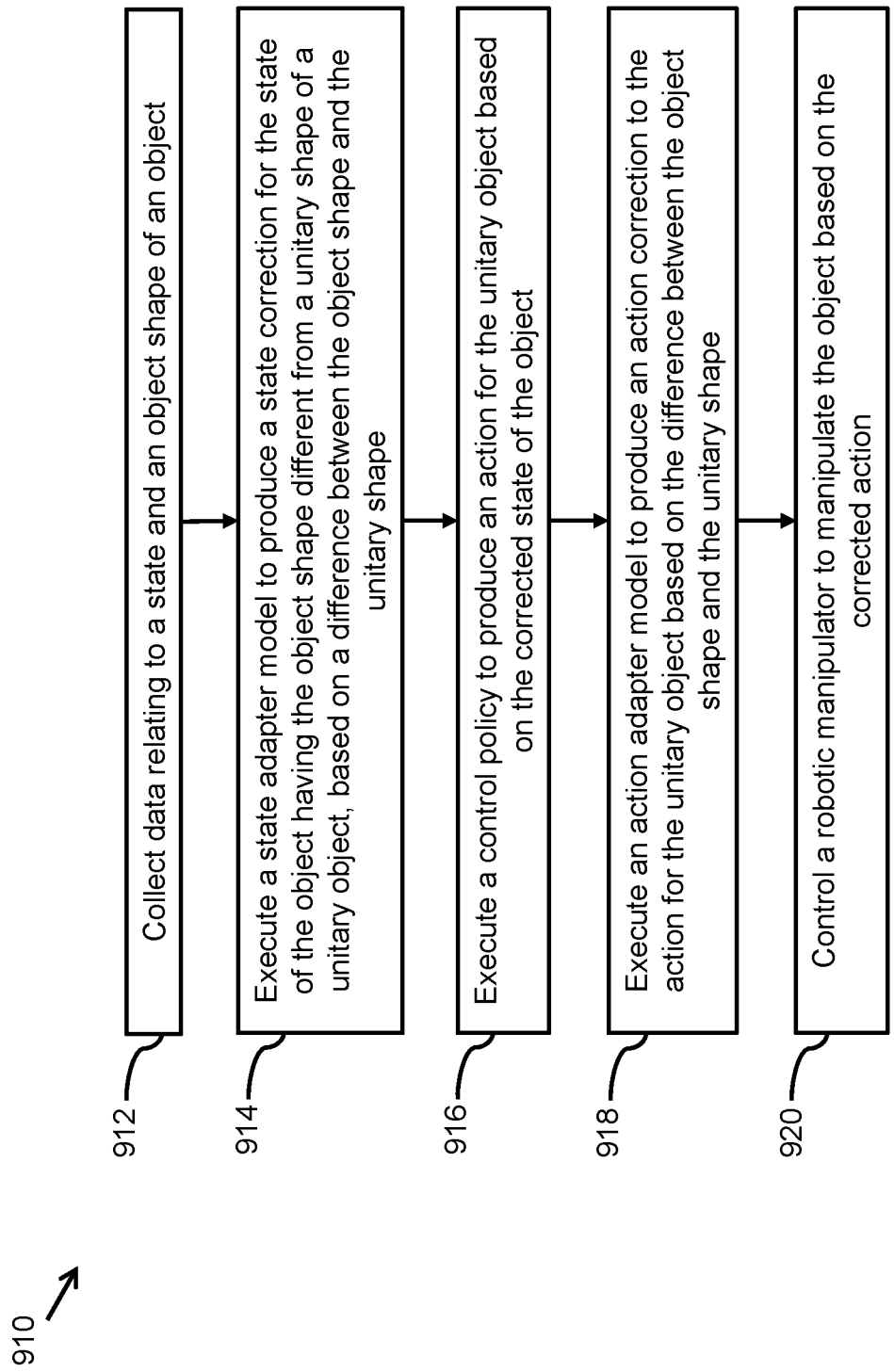
FIG. 9B shows an example method for generating a corrected action for the object, according to an embodiment of the present disclosure.

Referring to FIG. 9B, an example method 910 for generating a corrected action for the object 726 is illustrated, according to an embodiment. Pursuant to present example, the object property relates to an object shape of the object 726 and the unitary property 118*b* relates to a unitary shape of the unitary object 402 or 704. For example, the unitary shape may be a box or cuboid. Moreover, the object shape may be a non-linear cylinder, such as a soap dispenser or a ketchup bottle.

At 912, data relating to a state and an object shape of the object 726 may be collected. For example, the state or pose and the object shape may be identified based on a depth image of the object 726 generated by a RGB-D camera.

At 914, the state adapter model 118*c* is executed to produce a state correction for the state of the object having the object shape different from the unitary shape, based on a difference between the object shape and the unitary shape. In an example, the state adapter model 118*c* takes as input the object shape of the object 726 and projects a latent space of the state of the object 726 and/or the object shape of the object 726 to a latent space of a state of the unitary object 402 or 704 and/or the unitary shape of the unitary object 402 or 704. Based on the difference in the latent spaces, the state correction to the state of the object 726 may be determined to generate a corrected state.

Further, at 916, the control policy 118*a* is executed to produce an action for the unitary object 402 or 704, based on the corrected state of the object 726. In an example, the control policy 118*a* may generate the action for the unitary object based on a state-action mapping between the corrected state of the object 728 and an action space for the unitary object 402 or 704.

At 918, the action adapter model 118*d* may be executed to produce an action correction to the action produced by the control policy 118*a* based on the difference between the object shape and the unitary shape. In an example, the action generated by the control policy 118*a* may be agnostic to the object shape. The action correction may be produced to transform the generated action that conforms to, for example a type of task performed on the unitary object, a unitary size, external environment of the unitary object, unitary shape, robotic manipulator used, and other property associated with the unitary object 402 or 704. Based on the action correction, the action may be transformed to be performed on the object 726 based on the features associated with the object 726.

At 920, the corrected action is used to control the robotic manipulator 102 to manipulate the object 726.

The action adapter model 118*d* enables to adjust the control policy 118*a* according to the object property or the object shape. In particular, even though original action trajectories for manipulating the unitary object 402 or 704 are very diverse, the state adapter model 118*c* and the action adapter model 118*d* brings the action trajectories together to enable the control policy 118*a* to adapt to new objects.

It will be understood that each block of the flow diagrams of the methods 200, 300, 310, 320, 600, 800, 900, and 910 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory unit 118 of the controller 114, employing an embodiment of the present invention and executed by the processor 117. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the methods 200, 300, 310, 320, 600, 800, 900, and 910 support combinations of means for performing the specified functions and combinations of operations for performing the specified functions. It will also be understood that one or more blocks of the methods 200, 300, 310, 320, 600, 800, 900, and 910, and combinations of blocks in the methods 200, 300, 310, 320, 600, 800, 900, and 910, may be implemented by special purpose hardware-based computer systems which perform the specified functions, or combinations of special purpose hardware and computer instructions.

Further using the steps described in the accompanying embodiments of the methods 200, 300, 310, 320, 600, 800, 900, and 910, which implement the controller for controlling the robotic manipulator 102, the accuracy of manipulation operations over new unseen objects may be highly improved.

The above-described embodiments of the present disclosure can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed but are used merely as labels to distinguish one claim element having a certain name from another element having a same name (but for use of the ordinal term) to distinguish the claim elements.

Although the disclosure has been described by way of examples of preferred embodiments, it is to be understood that various other adaptations and modifications can be made within the spirit and scope of the disclosure.

Therefore, it is the object of the appended claims to cover all such variations and modifications as come within the true spirit and scope of the disclosure.

We claim:

1. A controller for controlling a robotic manipulator to manipulate an object according to a task, comprising:
   a memory configured to store
      a control policy configured to produce an action for the robotic manipulator to manipulate a unitary object having a predetermined unitary property, such that the control policy is configured to map a state of the unitary object to the action of the robotic manipulator to manipulate the unitary object according to the task,
      a state adapter model configured to produce a state correction for a state of the object having an object property different from the unitary property, based on a difference between the object property and the unitary property, and
      an action adapter model configured to produce an action correction to the action produced by the control policy based on the difference between the unitary property and the object property;
   a processor configured to
   collect data relating to the state and the object property of the object;
   execute the state adapter model to produce the state correction for the state of the object to generate a corrected state of the object based on the collected data;
   execute the control policy using the corrected state of the object to produce the action for the unitary object;
   execute the action adapter model to produce the action correction to the action for the unitary object to generate a corrected action; and
   control the robotic manipulator with the corrected action for the unitary object.

2. The controller of claim 1, wherein the action adapter model is configured to produce the action correction to the action for the unitary object based on the corrected state of the object and property encoding of the object property relating to the object.

3. The controller of claim 2, wherein the processor is further configured to:
   process, by executing an encoder, the object property of the object to produce the property encoding;
   transmit the property encoding to the state adapter model and the action adapter model; and
   produce, by executing the control policy, the state adapter model and the action adapter model, the corrected action based on the property encoding.

4. The controller of claim 1, wherein the object property is associated with at least one of: shape, size, density, weight, or material.

5. The controller of claim 4, wherein when the object property and the unitary property relates to the shape of the object and the unitary object, respectively, the processor is further configured to:
   produce, using the state adapter model, the state correction for the state of the object having an object shape different from a unitary shape, based on a difference between the object shape and the unitary shape; and
   produce, using the action adapter model, the action correction to the action produced by the control policy based on the difference between the unitary shape and the object shape.

6. The controller of claim 1, wherein to train the control policy, the processor is further configured to:
   generate a dataset comprising a set of random objects, the set of random objects having corresponding random shapes different from a unitary shape of the unitary object;
   learn the feature space for the random objects based on a difference between each of the random object shapes and the unitary shape; and
   determine a predicted object shape for each of the set of random objects based on the learned feature space.

7. The controller of claim 1, wherein the object property is captured using one or more sensors.

8. The controller of claim 1, wherein the corrected action comprises action parameters for controlling an interaction between the robotic manipulator and the object.

9. The controller of claim 1, wherein the control policy comprises a neural network trained with reinforcement learning.

10. The controller of claim 1, wherein each of the state adapter model and the action adapter model comprises a neural network, wherein the state adapter model and the action adapter model are trained with machine learning.

11. The controller of claim 1, wherein, to train the controller, the processor is further configured to:
    cause the state adapter model to learn one or more linear transformations to produce a state correction to the state of the unitary object for a synthetic object;
    cause the action adapter model to learn one or more linear transformations to produce an action correction to an action for the unitary object based on the corrected state; and
    adapt the control policy for the synthetic object based on the learning.

12. The controller of claim 1, wherein the processor is further configured to:
    generate a simulation environment of the task based on the unitary property; and
    produce the action correction based on the simulation environment.

13. A method for controlling a robotic manipulator to manipulate an object according to a task, the method comprising:
    collecting data relating to a state and an object property of the object;
    producing, using a state adapter model, a state correction for the state of the object to generate a corrected state of the object based on a difference between the object property and a predetermined unitary property of a unitary object;
    producing, using a control policy, an action for the unitary object using the corrected state of the object, wherein the action is for a robotic manipulator to manipulate the unitary object, such that the control policy is configured to map a state of the unitary object to the action of the robotic manipulator to manipulate the unitary object according to the task;
producing, using an action adapter model, an action correction to the action for the unitary object to generate a corrected action, based on the action for the unitary object produced by the control policy and the difference between the unitary property and the object property; and
controlling the robotic manipulator with the corrected action for the unitary object.

14. The method of claim 13, further comprising:
processing, by executing an encoder, the object property of the object to produce a property encoding;
transmitting the property encoding to the state adapter model and the action adapter model; and
producing, by executing the state adapter model and the action adapter model, the corrected action based on the property encoding.

15. The method of claim 13, wherein the object property is associated with at least one of: shape, size, density, weight, or material.

16. The method of claim 15, wherein when the object property and the unitary property relates to the shape of the object and the unitary object, respectively, the method further comprises:
producing, using the state adapter model, the state correction to the state of the object having an object shape different from a unitary shape based on a difference between the object shape and the unitary shape; and
producing, using the action adapter model, the action correction to the action produced by the control policy based on the difference between the unitary shape and the object shape.

17. The method of claim 13, wherein to train the control policy, the method further comprises:
generating a dataset comprising a set of random objects, the set of random objects having corresponding random shapes different from a unitary shape of the unitary object;
learning the feature space for the random objects based on a difference between each of the random object shapes and the unitary shape; and
determining a predicted object shape for each of the set of random objects based on the learned feature space.

18. The method of claim 13, wherein the control policy comprises a neural network trained with reinforcement learning.

19. The method of claim 13, wherein each of the state adapter model and the action adapter model comprises a control policy, wherein the state adapter model and the action adapter model are trained with machine learning.

20. A non-transitory computer readable storage medium embodied thereon a program executable by a processor for performing a method, the method comprising:
collecting data relating to a state and an object property of an object;
producing, using a state adapter model, a state correction for the state of the object to generate a corrected state of the object, based on a difference between the object property and a predetermined unitary property of a unitary object;
producing, using a control policy, an action for the unitary object using the corrected state of the object, wherein the action is for a robotic manipulator to manipulate the unitary object, such that the control policy is configured to map a state of the unitary object to the action of the robotic manipulator to manipulate the unitary object according to the task;
producing, using an action adapter model, an action correction to the action for the unitary object to generate a corrected action based on the action for the unitary object produced by the control policy and the difference between the unitary property and the object property; and
controlling the robotic manipulator with the corrected action for the unitary object.

* * * * *